United States Patent [19]

Shijo et al.

[11] Patent Number: 5,790,701
[45] Date of Patent: Aug. 4, 1998

[54] CHARACTER RECOGNITION APPARATUS USING EDGE IMAGES

[75] Inventors: Toru Shijo, Yokohama; Yoshikatu Nakamura, Yokosuka; Toru Homma, Kawaguchi, all of Japan

[73] Assignee: Kabushiki Kaisha Toshiba, Kawasaki, Japan

[21] Appl. No.: 464,347

[22] Filed: Jun. 5, 1995

[30] Foreign Application Priority Data

Jun. 6, 1994 [JP] Japan ................................. 6-123918
Sep. 30, 1994 [JP] Japan ................................. 6-238120

[51] Int. Cl.⁶ ........................... G06K 9/48; G06K 9/56
[52] U.S. Cl. .................................... 382/205; 382/197
[58] Field of Search .............................. 382/200, 177, 382/205, 197, 101, 102, 171

[56] References Cited

U.S. PATENT DOCUMENTS 4,903,313  2/1990  Tachikawa ........................ 382/205
4,908,872  3/1990  Toriu et al. ....................... 382/197
4,977,603  12/1990 Irie et al. ........................... 382/205
5,033,099  7/1991  Yamada et al. ................... 382/197

FOREIGN PATENT DOCUMENTS 1183793  7/1989  Japan .............................. G06K 9/62

Primary Examiner—Leo Boudreau
Assistant Examiner—Wenpeng Chen
Attorney, Agent, or Firm—Cushman Darby & Cushman IP Group of Pillsbury Madison & Sutro, LLP

[57] ABSTRACT

A character recognition apparatus comprises a photoelectric conversion section that converts image information including the characters to be recognized into multi-valued image information according to image density, an edge extracting circuit that creates edge image information indicating the outline of image density on the basis of the multi-valued image information from the photoelectric conversion section, and a recognition circuit that computes a distribution of a direction component so as to create a feature vector and recognizes characters on the basis of the direction feature vector.

3 Claims, 37 Drawing Sheets

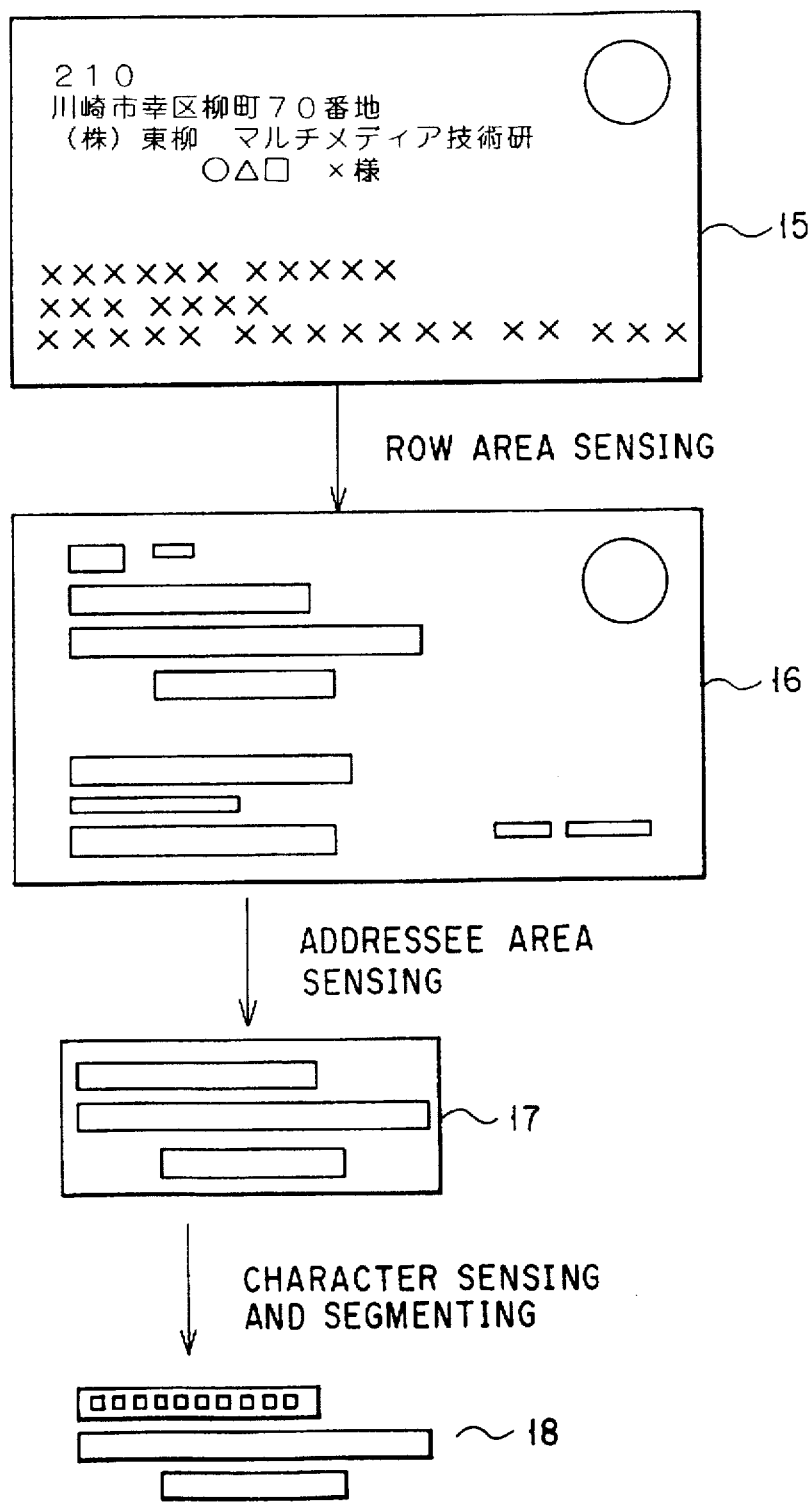
F I G. 2

| 4-BIT DIRECTION CODE | EXISTING DIRECTION COMPONENT | | | |
|---|---|---|---|---|
| X X Y Y<br>− + − + | WIDTH ONLY | HEIGHT ONLY | RIGHT-RISING | LEFT-RISING |
| 0 0 0 0 | — | — | — | — |
| 0 0 0 1 | ○ | — | — | — |
| 0 0 1 0 | ○ | — | — | — |
| 0 0 1 1 | ○ | — | — | — |
| 0 1 0 0 | — | ○ | — | — |
| 0 1 0 1 | — | — | ○ | — |
| 0 1 1 0 | — | — | — | ○ |
| 0 1 1 1 | — | — | ○ | ○ |
| 1 0 0 0 | — | ○ | — | — |
| 1 0 0 1 | — | — | — | ○ |
| 1 0 1 0 | — | — | ○ | — |
| 1 0 1 1 | — | — | ○ | ○ |
| 1 1 0 0 | — | ○ | — | — |
| 1 1 0 1 | — | — | ○ | ○ |
| 1 1 1 0 | — | — | ○ | ○ |
| 1 1 1 1 | — | — | ○ | ○ |

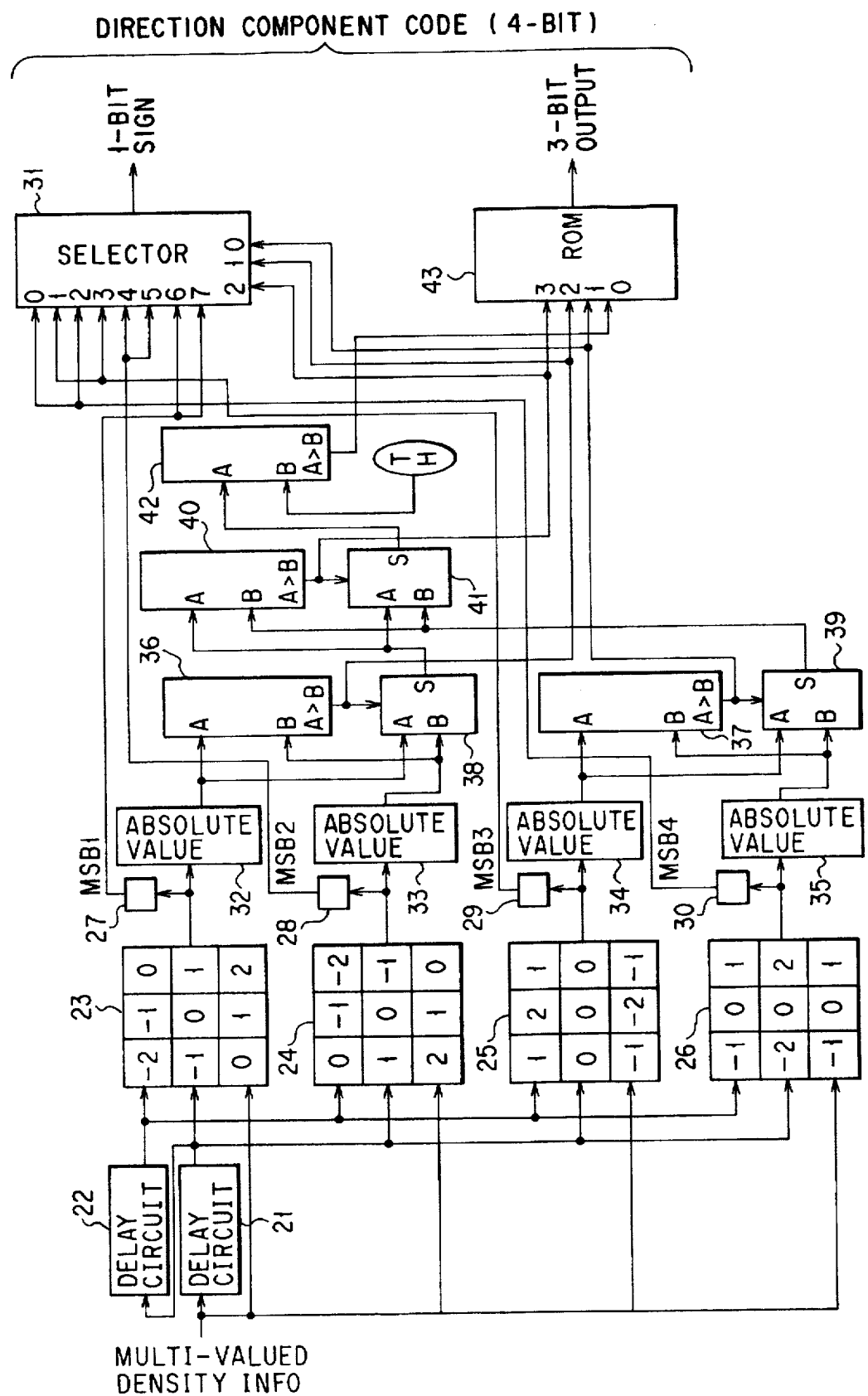
F I G. 29

| 4-BIT INPUT TO ROM | 3-BIT OUTPUT FROM ROM | DESCRIPTION OF 3-BIT OUTPUT |
|---|---|---|
| 0123 | 012 | DIRECTION COMPONENT |
| 0000 | 000 | NONE |
| 0001 | 000 | NONE |
| 0010 | 000 | NONE |
| 0011 | 000 | NONE |
| 0100 | 000 | NONE |
| 0101 | 000 | NONE |
| 0110 | 000 | NONE |
| 0111 | 000 | NONE |
| 1000 | 100 | HEIGHT |
| 1001 | 010 | RIGHT-RISING INCLINE |
| 1010 | 100 | HEIGHT |
| 1011 | 001 | LEFT-RISING INCLINE |
| 1100 | 011 | WIDTH |
| 1101 | 010 | RIGHT-RISING INCLINE |
| 1110 | 011 | WIDTH |
| 1111 | 001 | LEFT-RISING INCLINE |

FIG. 30

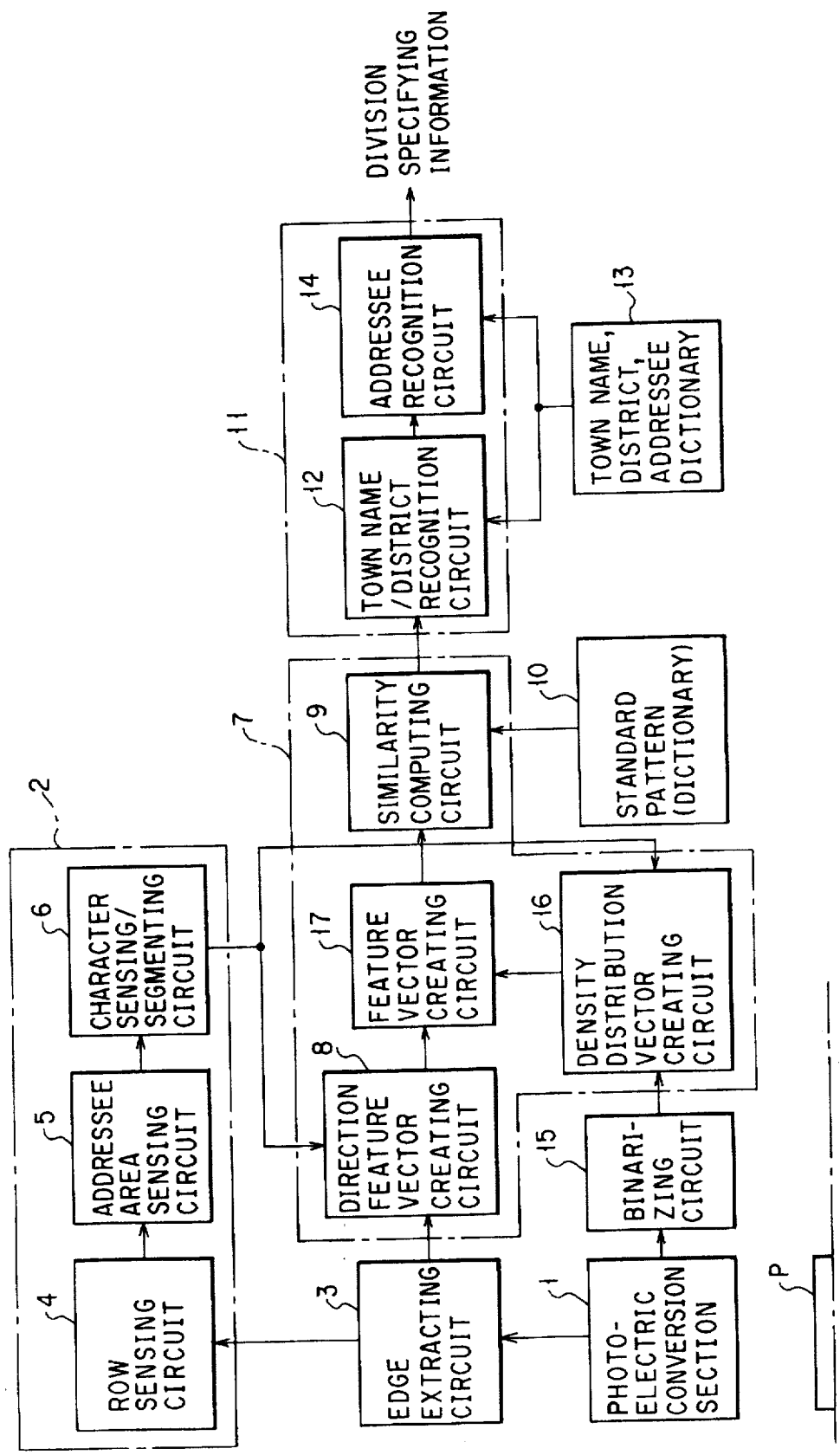
F I G. 31

FIG. 32

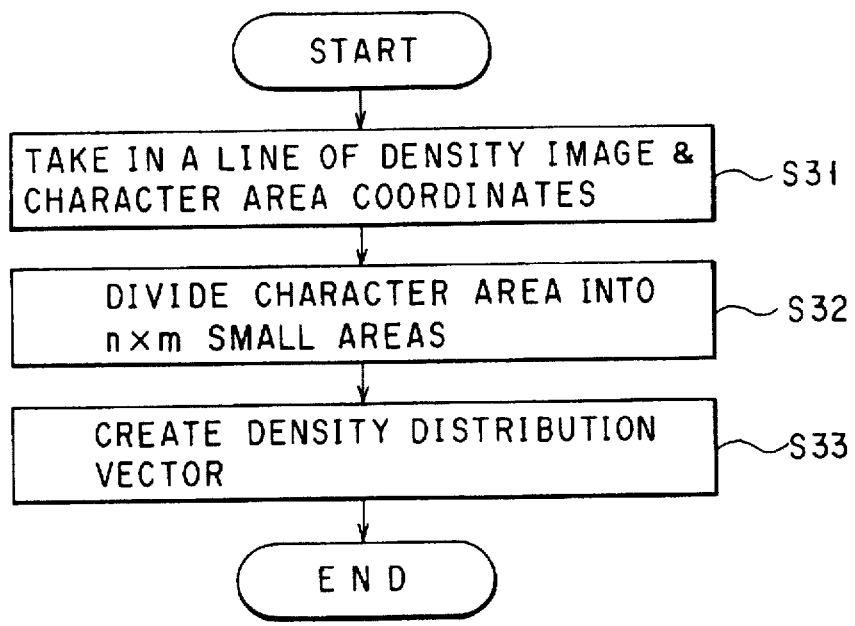
F I G. 33
DENSITY DISTRIBUTION VECTOR
```
 9  8  9  9  9  9 10  7
 9  5  4  3  3  8  7  1
 9  5  9  3  2  9  3  0
12  4  4 10 11  6  0  0
 9  3  1  8  8  8  1  0
 9  5  8  6  1  8  5  0
12 12 11  6  6  7  8  8
 8  4  3  3  3  3  4  4
```
F I G. 34

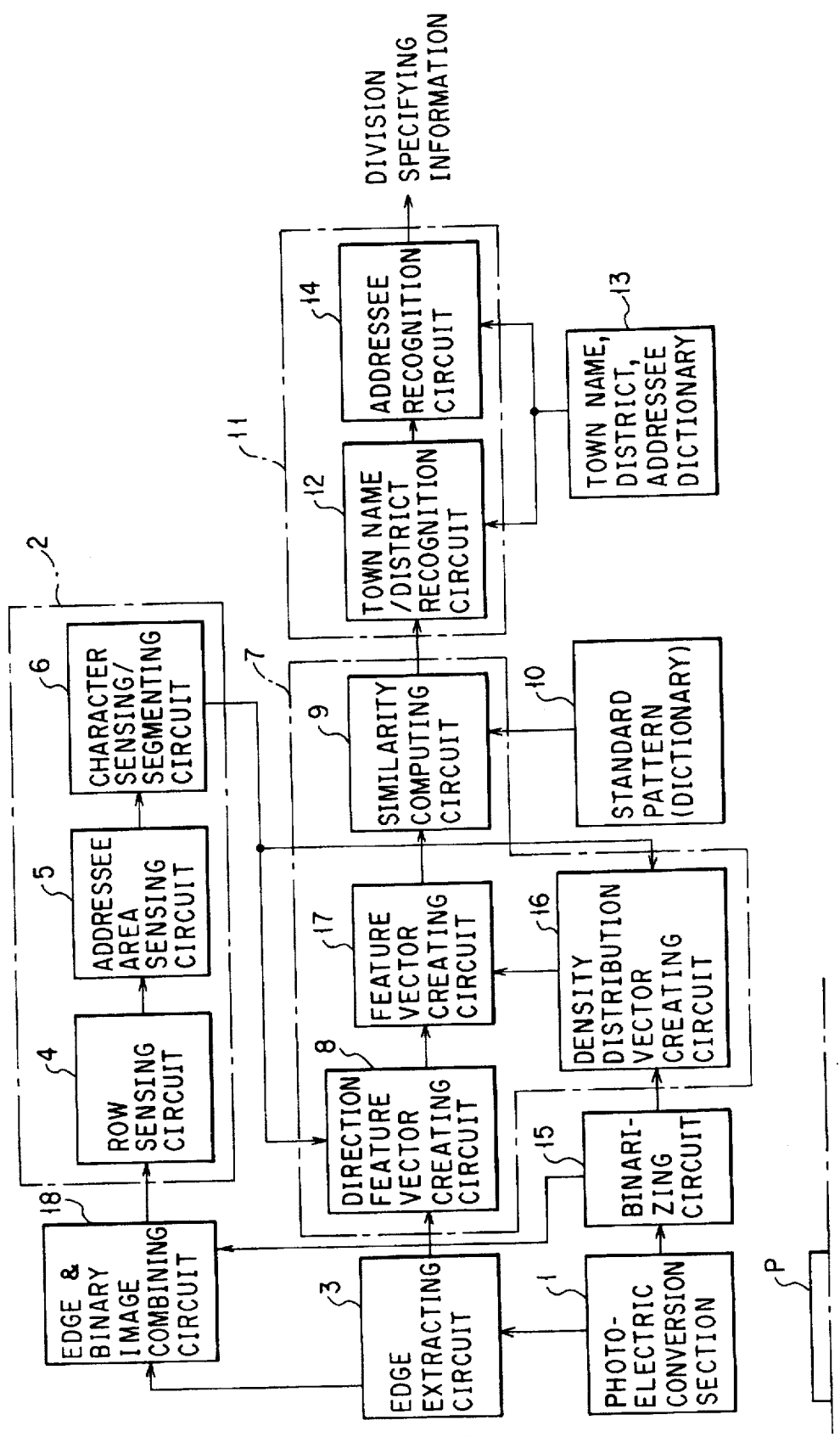
F I G. 36

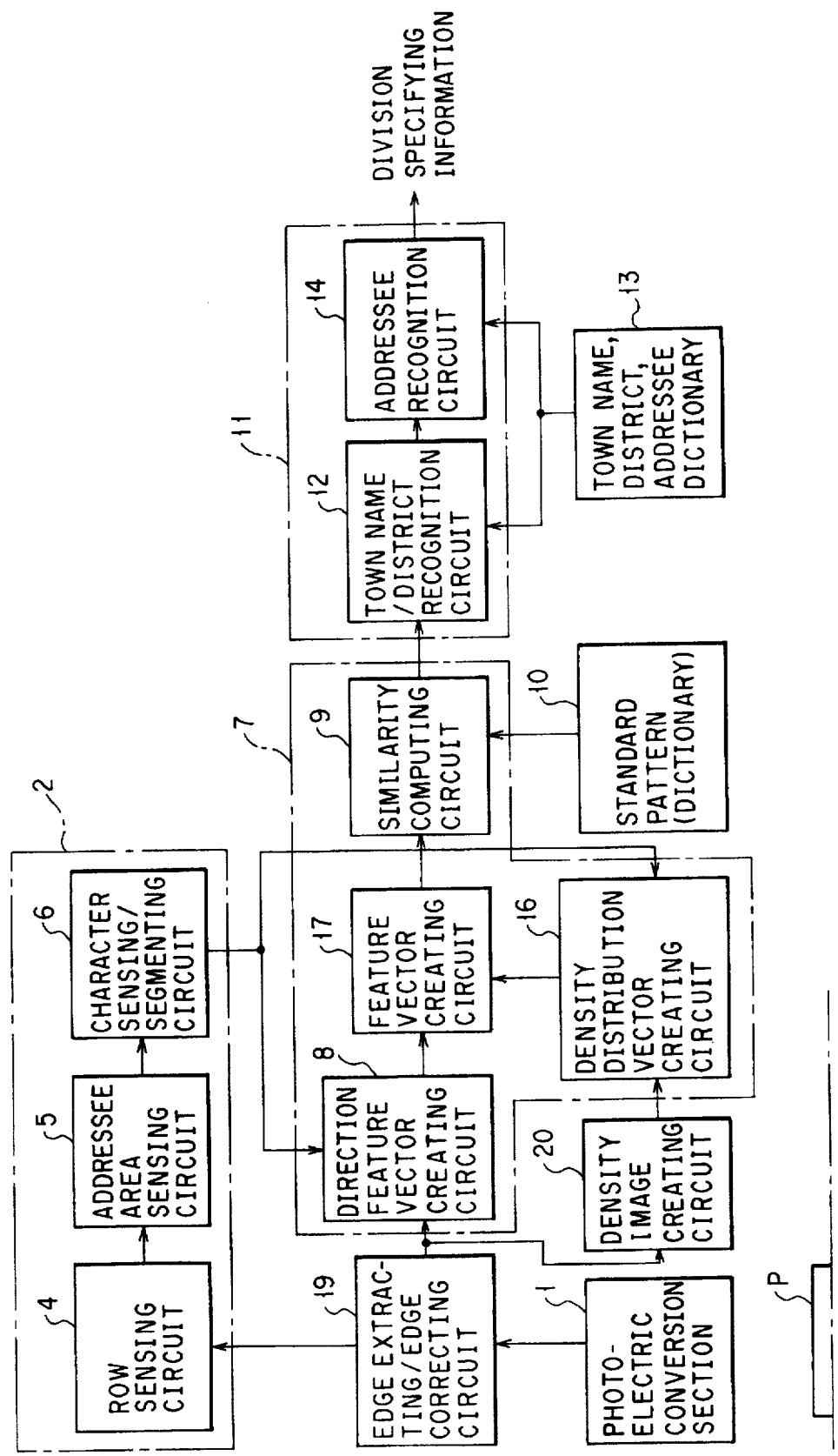
F I G. 37

CHARACTER RECOGNITION APPARATUS USING EDGE IMAGES

BACKGROUND OF THE INVENTION

1. Field of the Invention

This invention relates to a character recognition system that recognizes characters by a complex similarity method, in a postal-matter addressee reading apparatus that optically reads the addressee information on postal matter.

2. Description of the Related Art

A character recognition system based on a complex similarity method may be used as, for example, an application of character recognition techniques for the postal-matter addressee reading apparatus.

The recognition process through pattern matching for character recognition by a generally used similarity method may be considered to be, for example, a sequence of preprocessing and identification processing by similarity computations. In the preprocessing in character recognition using a conventional similar method, the inputted multi-valued images are binarized, and the character areas are sensed and segmented from the binarized images. The binarized images of the obtained character areas are normalized in size etc. and the results are inputted to a similarity computing circuit. Alternatively, four types of edge direction components, height, width, right-rising inclination, and left-rising inclination, are extracted from the binarized images, and the extracted components are used to produce the input for similarity computation.

In the character extraction of the direction components, attention is paid to adjacent 2×2-dot patterns of a binary image, and the 16 types of patterns are converted directly into the four types of direction components. Then, each character area is divided into n×m small areas (n small areas in height and m small areas in width), and each of the four types of direction components contained in each small area is counted, where n and m are natural numbers.

The thus created four types of n×m-dimensional frequency vectors are concatenated to produce an n×m×4-dimensional vector, which is used as an input pattern to the similarity computing circuit. The similarity computing circuit calculates the similarity between the input pattern and the standard pattern and outputs an identification candidate.

In the above-described preprocessing in character recognition system, the analog signal from the photoelectric converting section or the signal digitized into multiple values is binarized by absolute value evaluation. In this case, when the images to be recognized have non-uniform density or a small density width, blurring, missing, or crushing takes place, depending on the setting of the threshold value for binarization.

Such lack of information has a significant effect on the extraction of direction components, consequently leading to a decrease in the recognition rate. The extraction of direction components from a binary image requires either at least a 2×2 size mask process or a process of tracing the outline of the edge, causing a problem of increased processing time.

SUMMARY OF THE INVENTION

The object of the present invention is to provide a character recognition system which enables not only improvements in the character recognition capability in a wide range of image densities, but also improvements in the character recognition rate.

The foregoing object is accomplished by providing a character recognition apparatus comprising: means for converting image information including the characters to be recognized into multi-valued image information according to image density; means for creating edge image information indicating the outline of image density on the basis of the multi-valued image information from the converting means; and means for recognizing characters on the basis of the edge image information created at the creating means.

The foregoing object is also accomplished by providing a character recognition apparatus comprising: means for converting image information including the characters to be recognized into multi-valued image information according to image density; means for creating code image information by causing mask circuits for specific directions to perform a mask process on the multi-valued image information from the converting means; means for determining the character area on which the characters are written, on the basis of the code image information; means for creating a direction feature vector indicating the edge direction and the presence/absence of edges from the code image information for the character area; and means for performing character recognition by obtaining the similarity between the direction feature vector and a preset standard pattern vector.

With a character recognition apparatus of the former invention, because adjacent features are obtained from the multi-valued level image data, the accuracy of feature extraction is improved as compared with the case where edge features are obtained from a conventional binary image. Specifically, with the present invention, because an edge image, the outline of the image data, is created according to the change of light and shade of the multi-valued image data, even if the density of the image to be recognized is high or low on the whole, the accuracy of extraction of image data features is improved as compared with a conventional equivalent. This makes it possible to improve the character recognition capability over a wide range of image density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a conceptual diagram to help explain the processing at a character area sensing/segmenting section;

FIG. 8 is a diagram to help explain the correspondence between the 4-bit direction code and the 4 direction components;

FIG. 10 shows a multi-valued image of character "ward";

FIG. 11 shows an X-direction differential multi-valued image of character "ward";

FIG. 12 shows a Y-direction differential multi-valued image of character "ward";

FIG. 13 shows an image after the X-direction differential rising peak value of character "ward" has been sensed;

FIG. 14 shows an image after the X-direction differential falling peak value of character "ward" has been sensed;

FIG. 15 shows an image after the Y-direction differential rising peak value of character "ward" has been sensed;

FIG. 16 shows an image after the Y-direction differential falling peak value of character "ward" has been sensed;

FIG. 17 shows an image after the position of the X-direction differential falling peak value of character "ward" has been corrected;

FIG. 18 shows an image after the position of the Y-direction differential falling peak value of character "ward" has been corrected;

FIG. 19 is a conceptual diagram showing a composite image of the X-direction differential raising and falling peak values of character "ward";

FIG. 20 is a conceptual diagram showing a composite image of the Y-direction differential raising and falling peak values of character "ward";

FIG. 21 is a conceptual diagram showing a 4-bit direction code image of character "ward";

FIG. 22 is a conceptual diagram showing a binary edge image of character "ward";

Figure 23:
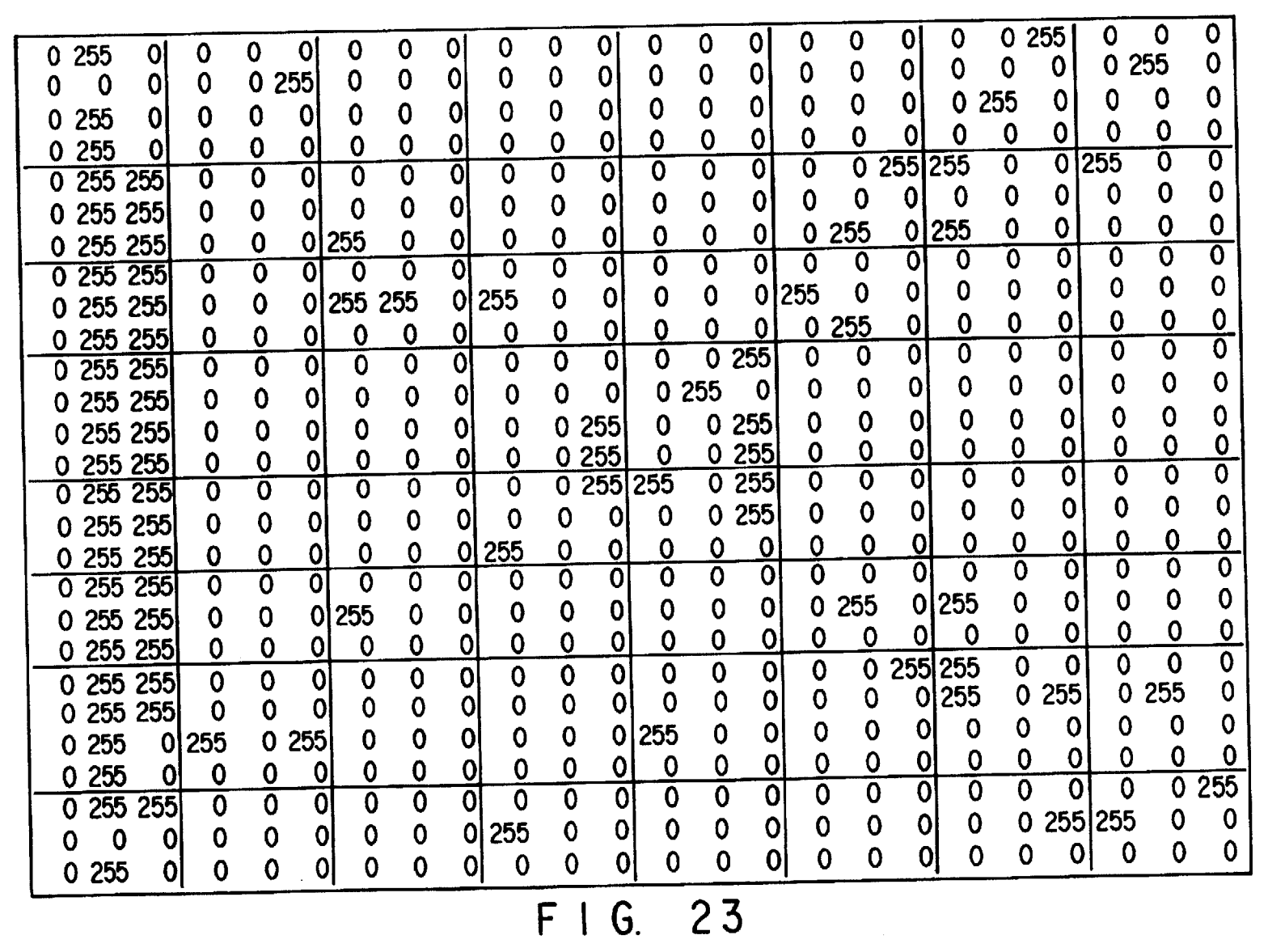

FIG. 23 shows an example of the image of the height components extracted from a direction code image according to a conversion table;

Figure 24:
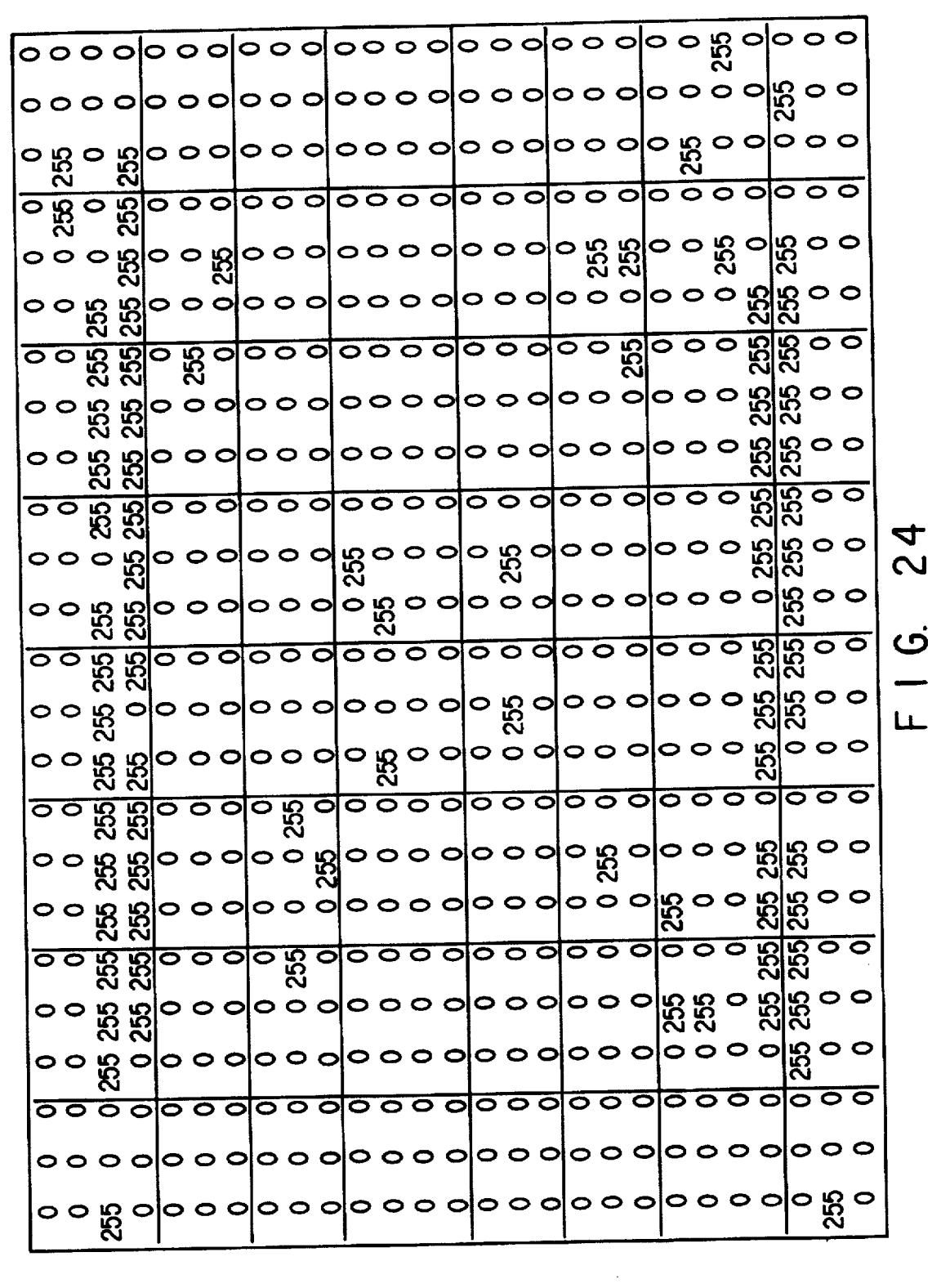

FIG. 24 shows an example of the image of the width components extracted from a direction code image according to a conversion table;

Figure 25:
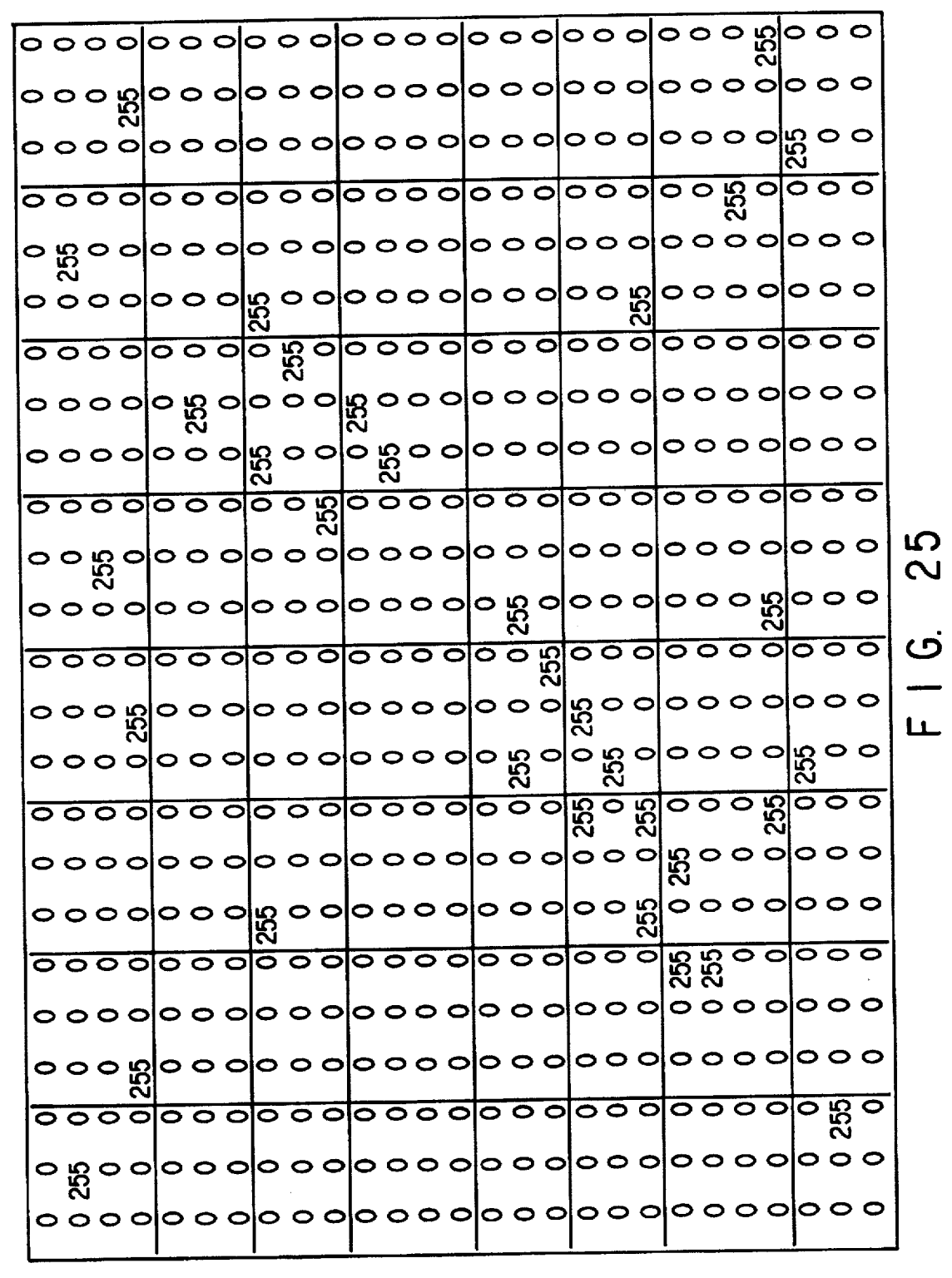

FIG. 25 shows an example of the image of the right-rising inclination components extracted from a direction code image according to a conversion table;

Figure 26:
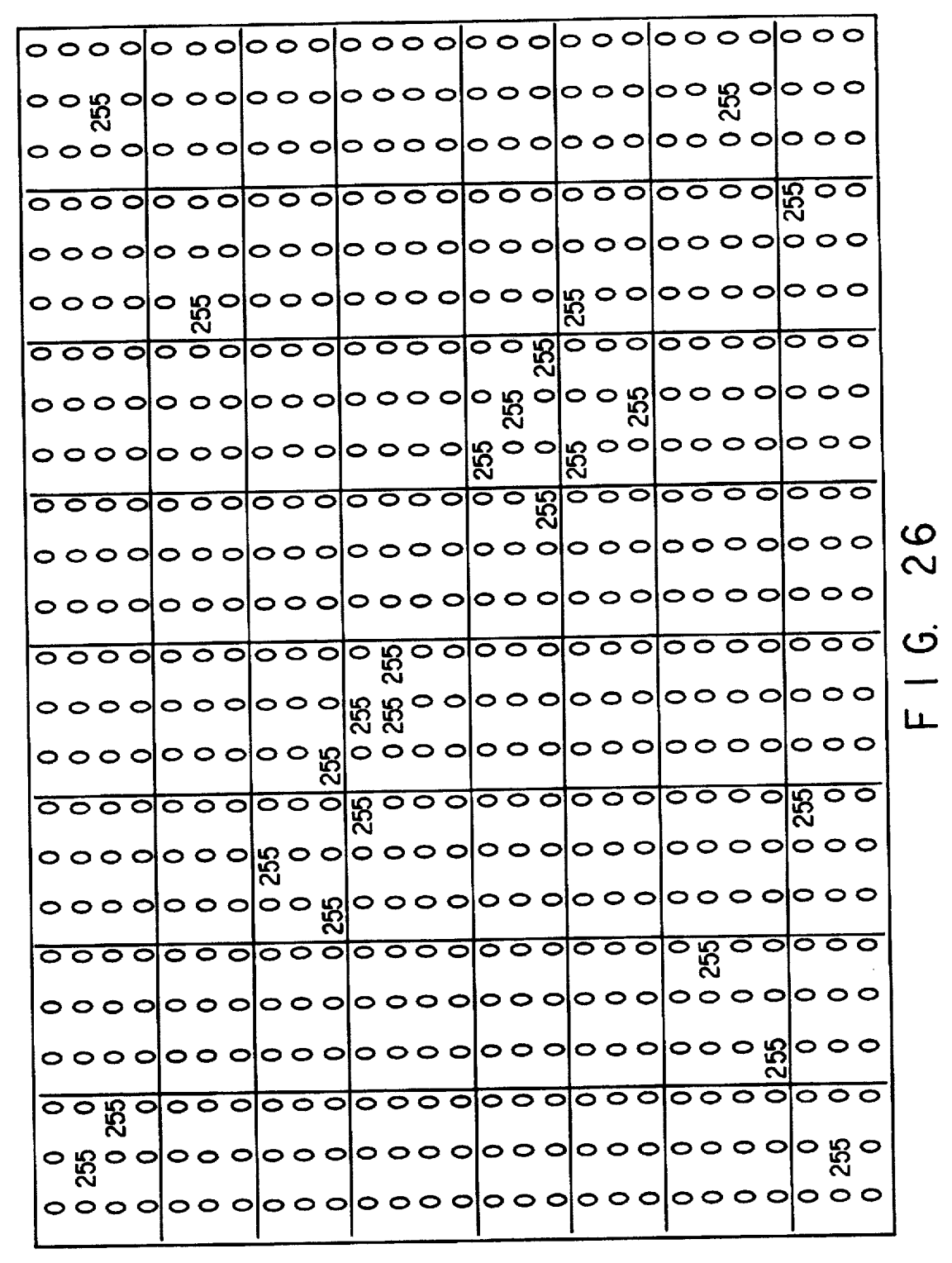

FIG. 26 shows an example of the image of the left-rising inclination components extracted from a direction code image according to a conversion table;

FIG. 29 is a block diagram of a concrete processing circuit for receiving multi-valued images and producing edge direction component code images in the second embodiment;

FIG. 30 is a diagram to help explain the correspondence between the 4-bit input to a ROM and its 3-bit output in the second embodiment;

FIG. 31 is a schematic block diagram of a postal-matter addressee reading apparatus to which a character recognition system according to a third embodiment of the present invention is applied;

FIG. 32 shows a binary image of character "ward";

FIG. 33 is a flowchart to help explain the processing at a density distribution vector creating circuit;

FIG. 34 shows an example of the density distribution vector created;

FIG. 36 is a schematic block diagram of a postal-matter addressee reading apparatus to which a character recognition system according to a seventh embodiment of the present invention is applied;

FIG. 37 is a schematic block diagram of a postal-matter addressee reading apparatus to which a character recognition system according to a ninth embodiment of the present invention is applied;

DETAILED DESCRIPTION OF THE PREFERRED EMBODIMENTS

Hereinafter, referring to the accompanying drawings, embodiments of the present invention will be explained.

Firstly, a first embodiment of the present invention will be described.

Figure 1:
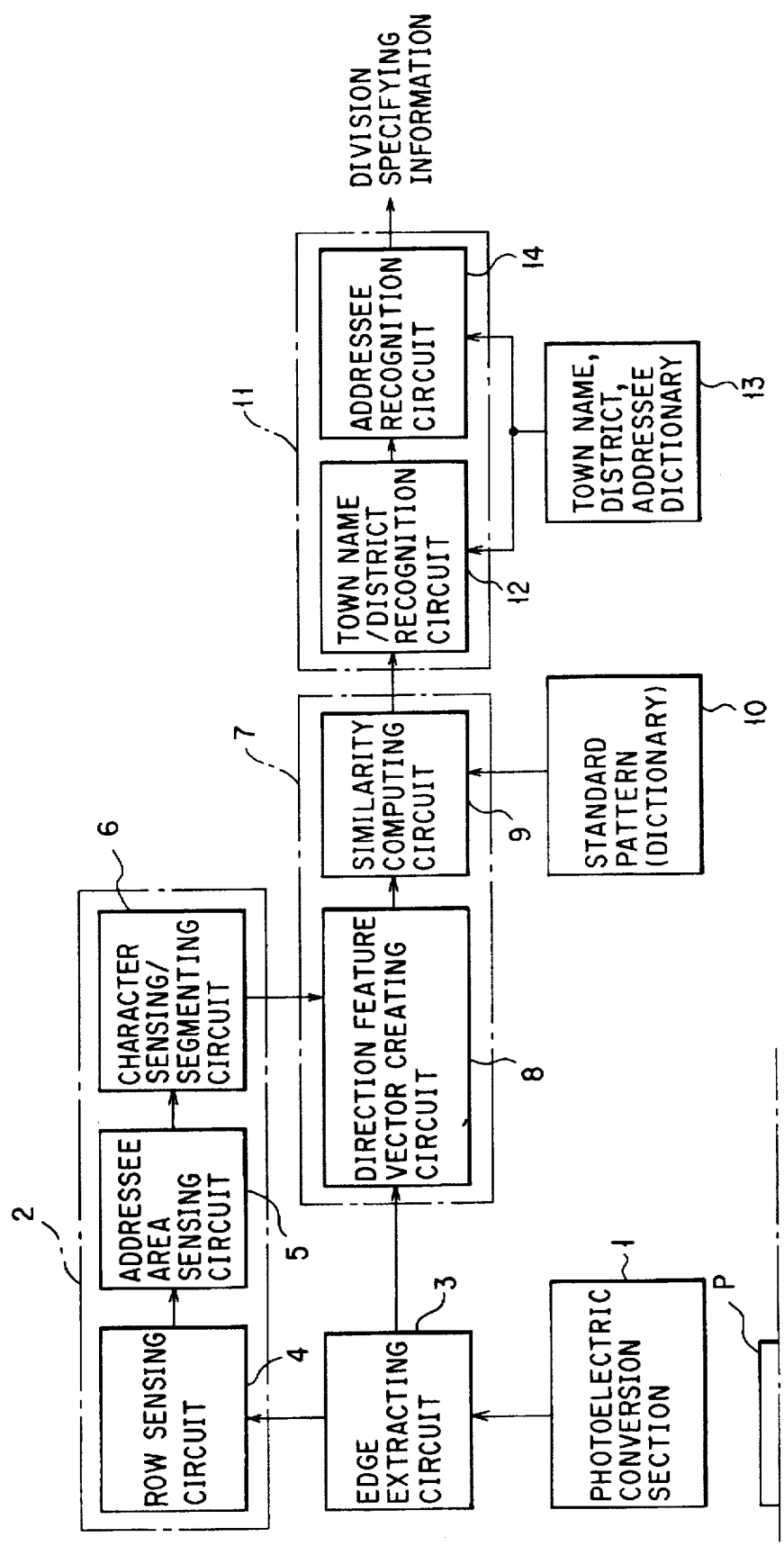
FIG. 1 is a schematic block diagram of a postal-matter addressee reading apparatus to which a character recognition system according to first and second embodiments of the present invention.

FIG. 1 schematically shows the configuration of a postal-matter addressee reading apparatus to which a character recognition system according to a first embodiment of the present invention is applied. In FIG. 1, a photoelectric conversion section 1 photo-electrically converts the image on postal matter P being advanced into multi-valued image information. The conversion section is composed of, for example, a light source that illuminates postal matter P, a line sensor that converts the reflected light from the postal matter P into an electric signal, and a signal processing section that carries out processes, including the digitization of the output of the line sensor. The multi-valued image on the postal matter P obtained at the photoelectric conversion section 1 is sent to a character area sensing/segmenting section 2.

The character area sensing/segmenting section 2 effects processing on the basis of the process conceptual drawings of FIG. 2. Specifically, an edge extracting circuit 3 first converts the inputted multi-valued image 15 into a direction code image with each pixel consisting of four bits, then converts the direction code image into a binary edge image, and sends the binary edge image to a row sensing circuit 4. The row sensing circuit 4 senses row 16 on the postal matter P on the binary edge image, and sends it to an addressee area sensing circuit 5.

The addressee area sensing circuit 5 senses an addressee area 17 on the postal matter P by collecting rows on the basis of the information obtained at the row sensing circuit 4, and sends the sensed area to a character sensing/segmenting circuit 6. The character sensing/segmenting circuit 6 senses and segments an area 18 for each character according to the projection information on the direction perpendicular to the row, for each row in the addressee area sensed at the addressee area sensing circuit 5. It then sends the result as character area coordinate data to a character recognition section 7.

In the character recognition section 7, a direction feature vector creating circuit 8 converts the area of each character obtained at the character sensing/segmenting circuit 6 into direction feature vectors indicating the distribution of each of the components of four directions, height, width, right-rising inclination, and left-rising inclination on the basis of the edge direction code image obtained at the edge extracting circuit 3, and sends the results to a similarity computing circuit 9.

The similarity computing circuit 9 receives the direction feature vectors from the direction feature vector creating circuit 8, performs character recognition by a complex similarity method using a character recognition dictionary (standard pattern) 10 previously designed off-line, and sends the recognition result to a knowledge processing section 11.

In the knowledge processing section 11, a town name/district recognition circuit 12 refers to a town name, district, and addressee dictionary 13 on the basis of the recognition result from the character recognition section 7, and recognizes a town name and a district, and then sends the result to an addressee recognition circuit 14. The addressee recognition circuit 14 refers to the town name, district, and addressee dictionary 13 on the basis of the recognition result from the town name/district recognition circuit 12, and recognizes the addressee information, and then outputs the recognition result as division specifying information.

Figures 3, 4:
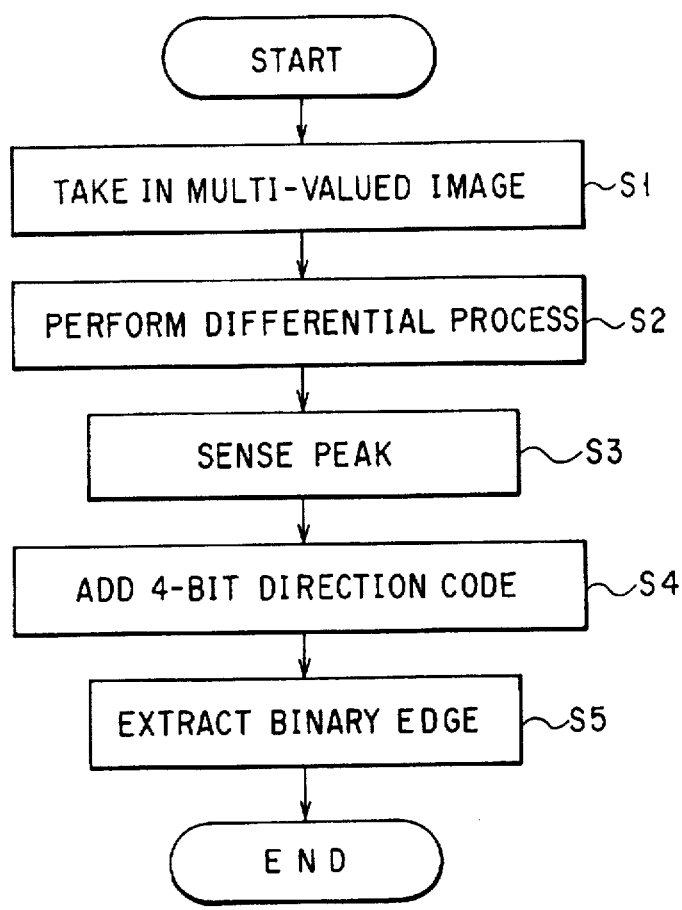
FIG. 3 is a flowchart to help explain the processing at an edge extracting circuit.
FIG. 4 shows examples of masks used to obtain differential values in the edge extracting circuit.

FIG. 3 is a flowchart for the processing at the edge extracting circuit 3 that converts the inputted multi-valued image into an edge direction code image and creates a binary edge image. Hereinafter, the processing based on the flowchart will be explained.

Figure 10:
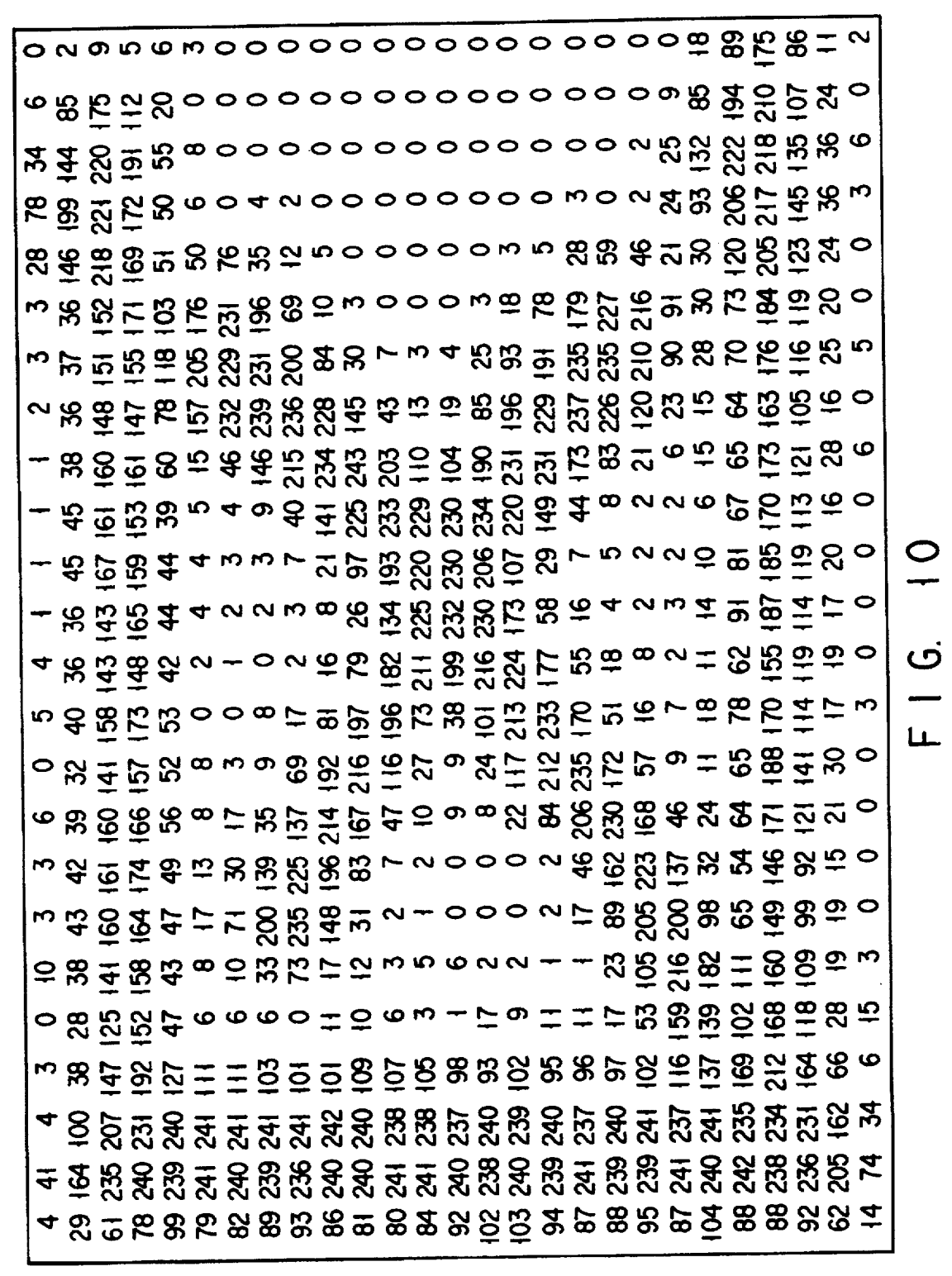

First, at step S1, for example, a multi-valued image to be recognized as shown in FIG. 10 (this example shows a multi-valued image of character "ward") is taken in from the photoelectric conversion section 1, and control proceeds to step S2. At step S2, the taken-in multi-valued image is converted into a multi-valued differential image through a differential process.

Here, it is assumed that two differential directions are used: X: left to right, Y: top to bottom. To obtain a differential value, it is assumed that masks which have, for example, an X direction of [−11] and a Y direction of [−11]T, respectively, and cross at right angles with each other, are used.

Figure 11:
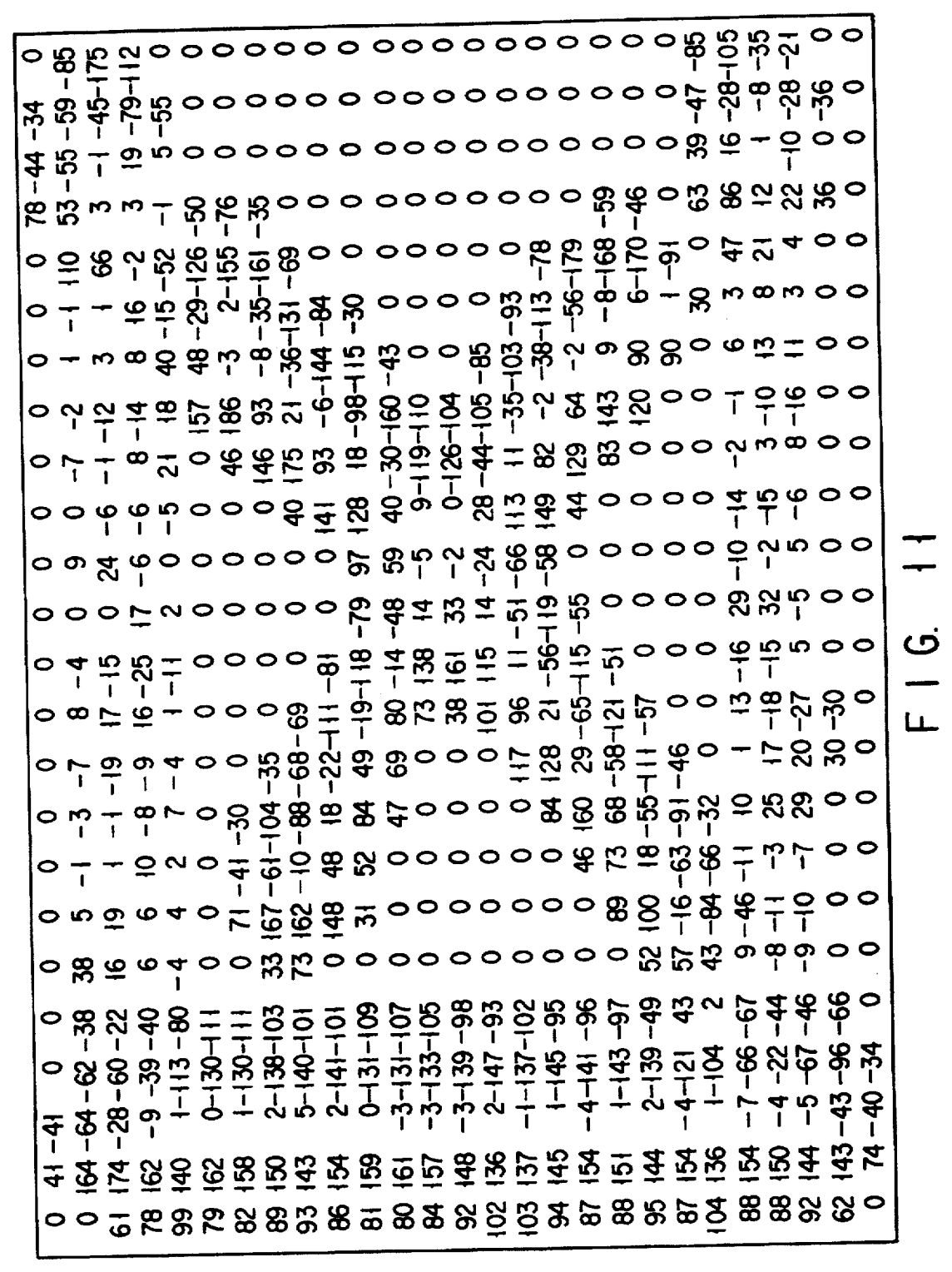
Figure 12:
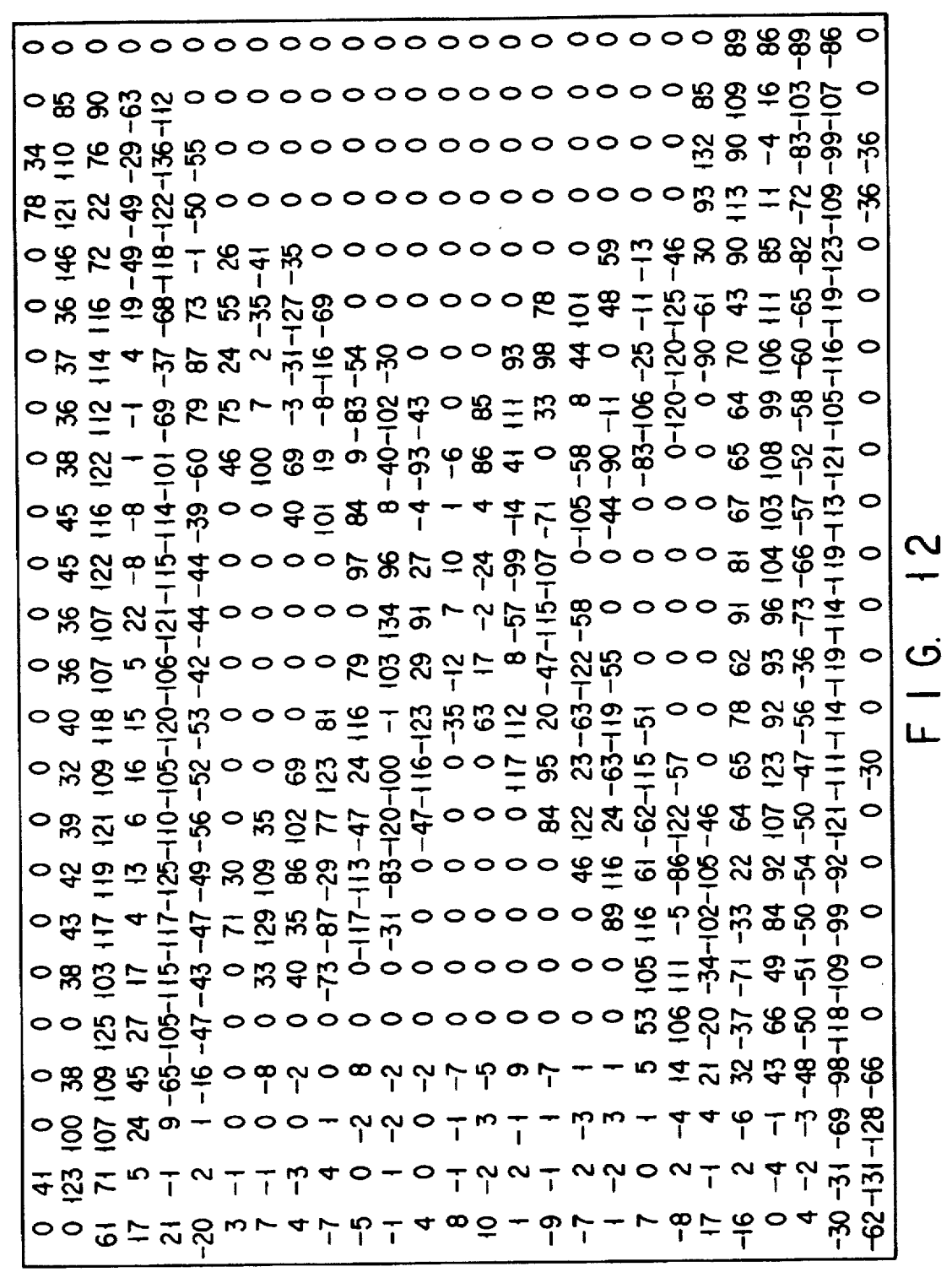

FIGS. 11 and 12 show differential multi-valued images in the X and Y directions obtained in the two mask processes, respectively. In these differential images, when the multi-valued images are rising in the X and Y directions, the differential values are positive; when the multi-valued images are falling, the differential values are negative.

Figure 13:
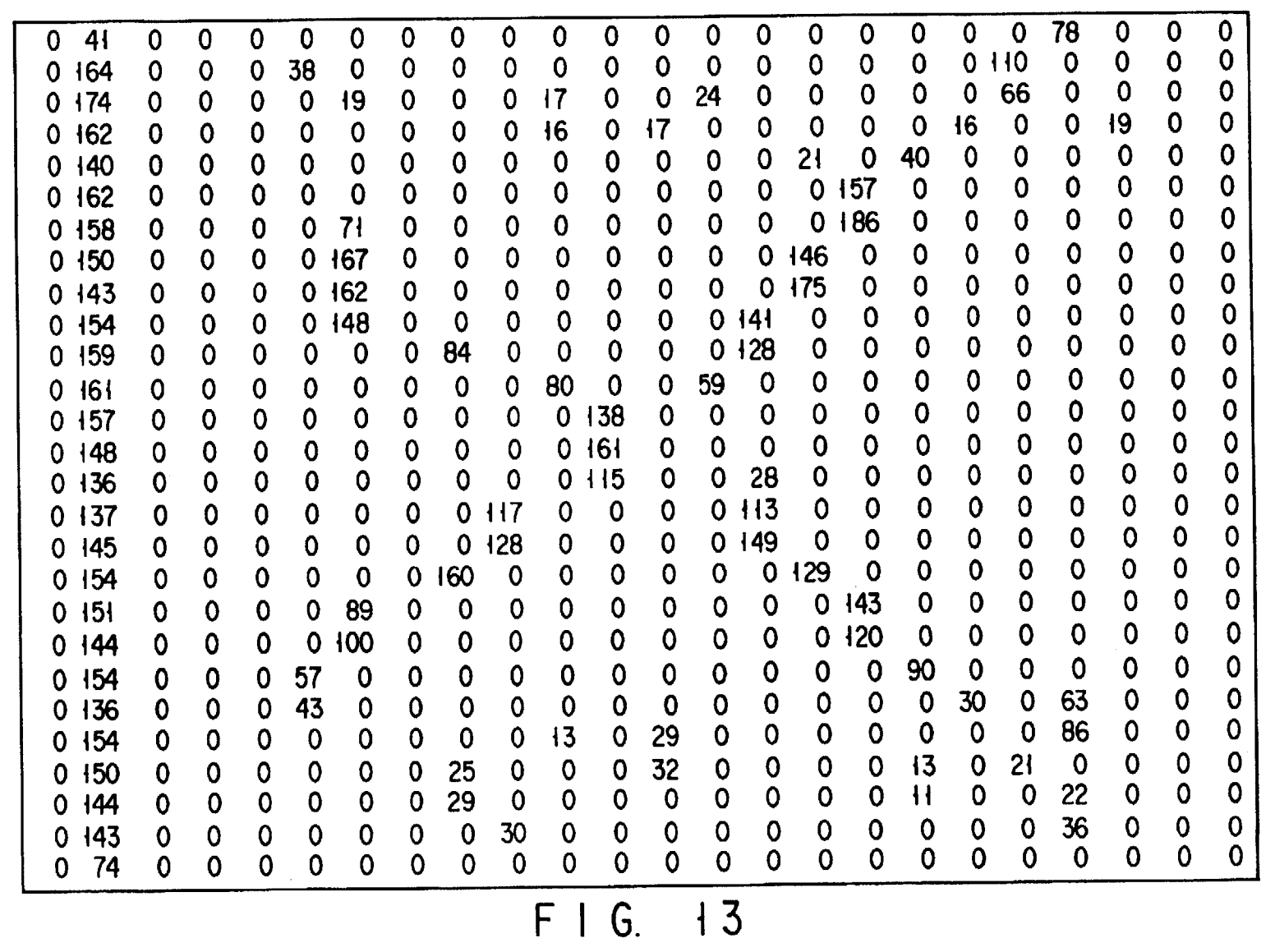
Figure 14:
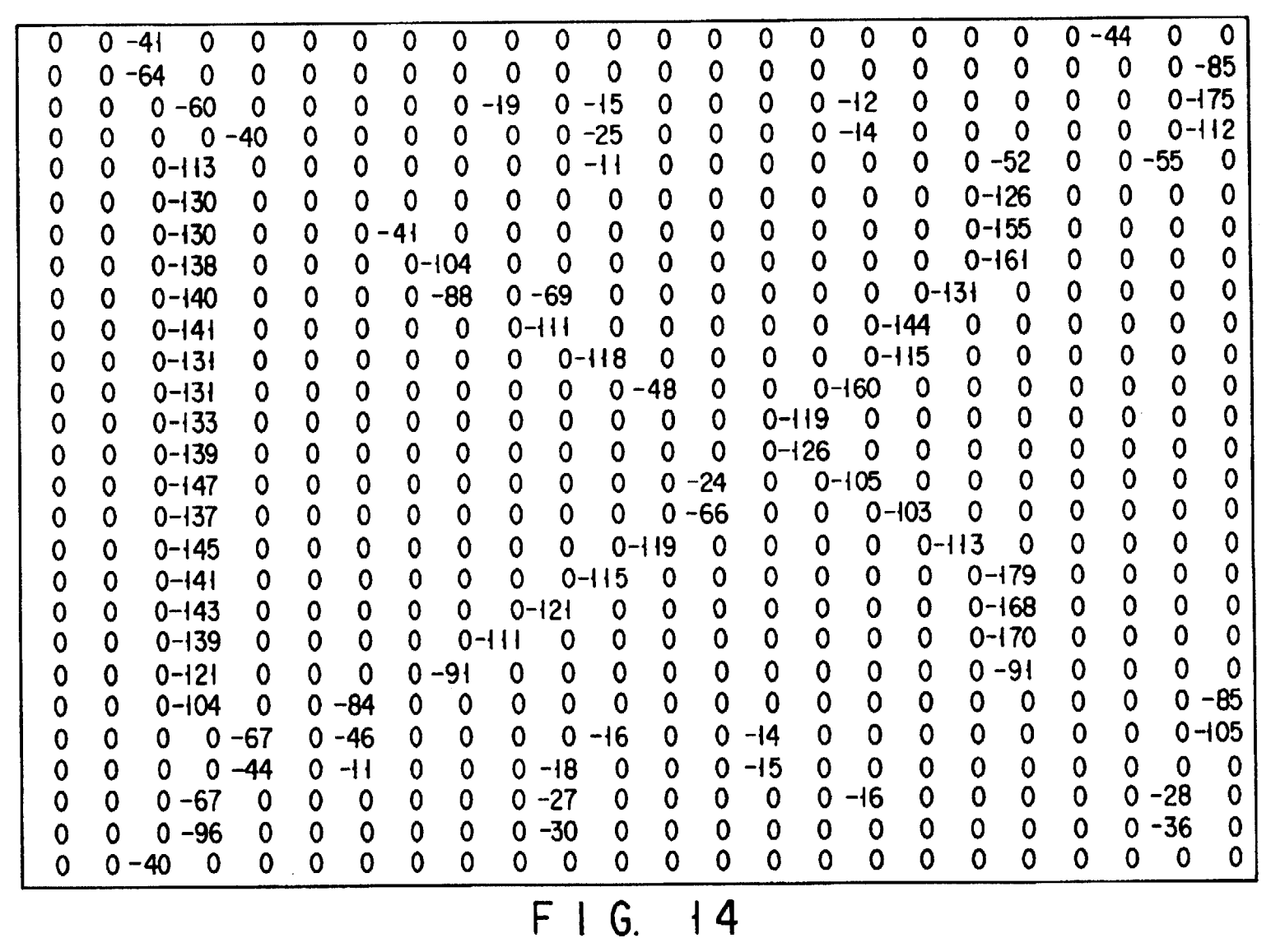
Figure 15:
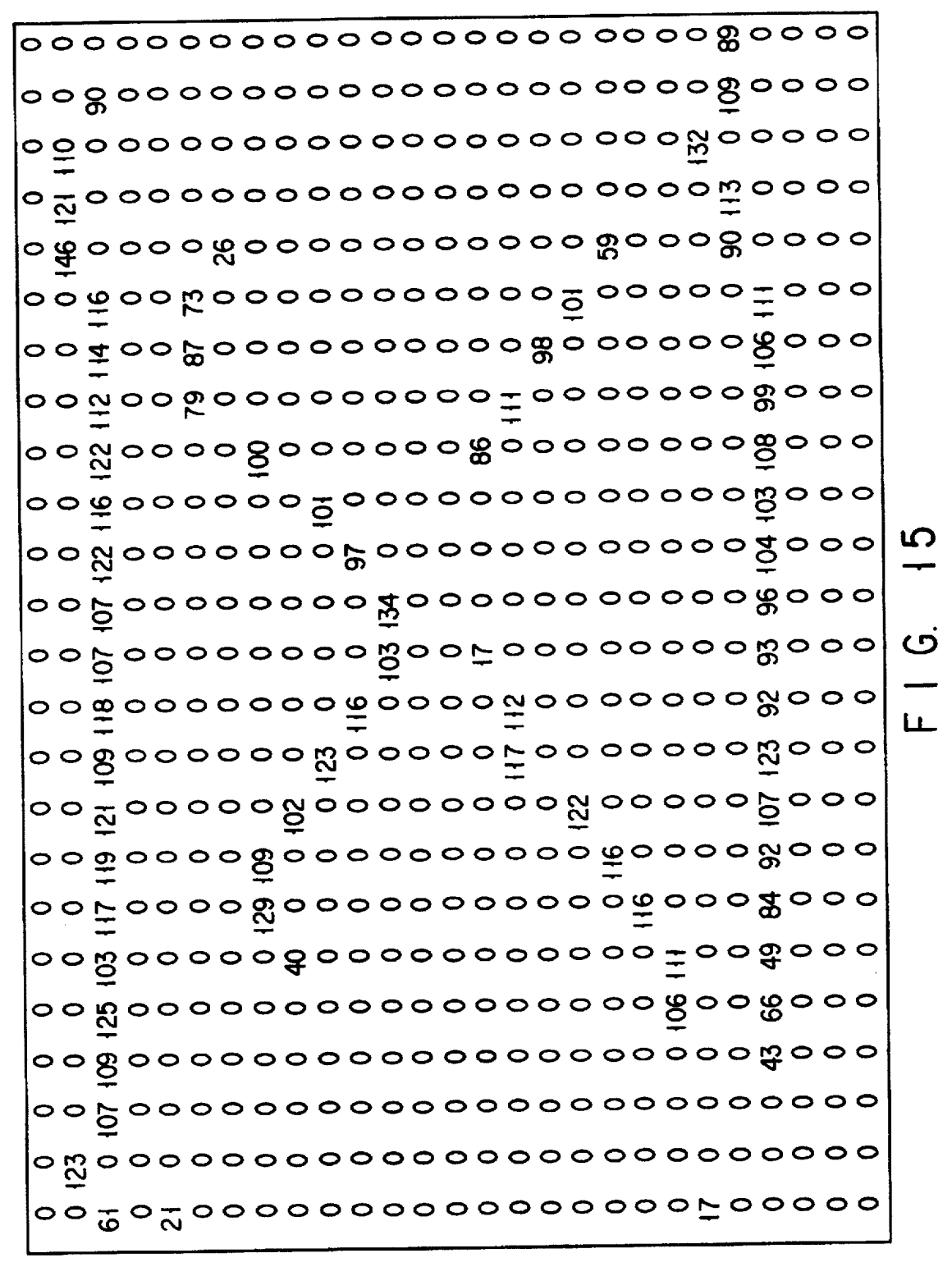

Then, in the peak sensing process at step S3, the edge of an image is extracted by sensing a maximal value and a minimal value in each of the two differential images. What are obtained by extracting the positive and negative peak values from the X-direction differential multi-valued image in FIG. 11 are shown in FIGS. 13 and 14, respectively. What are obtained by extracting the positive and negative peak values from the Y-direction differential multi-valued image in FIG. 12 are shown in FIGS. 15 and 16, respectively.

Figure 16:
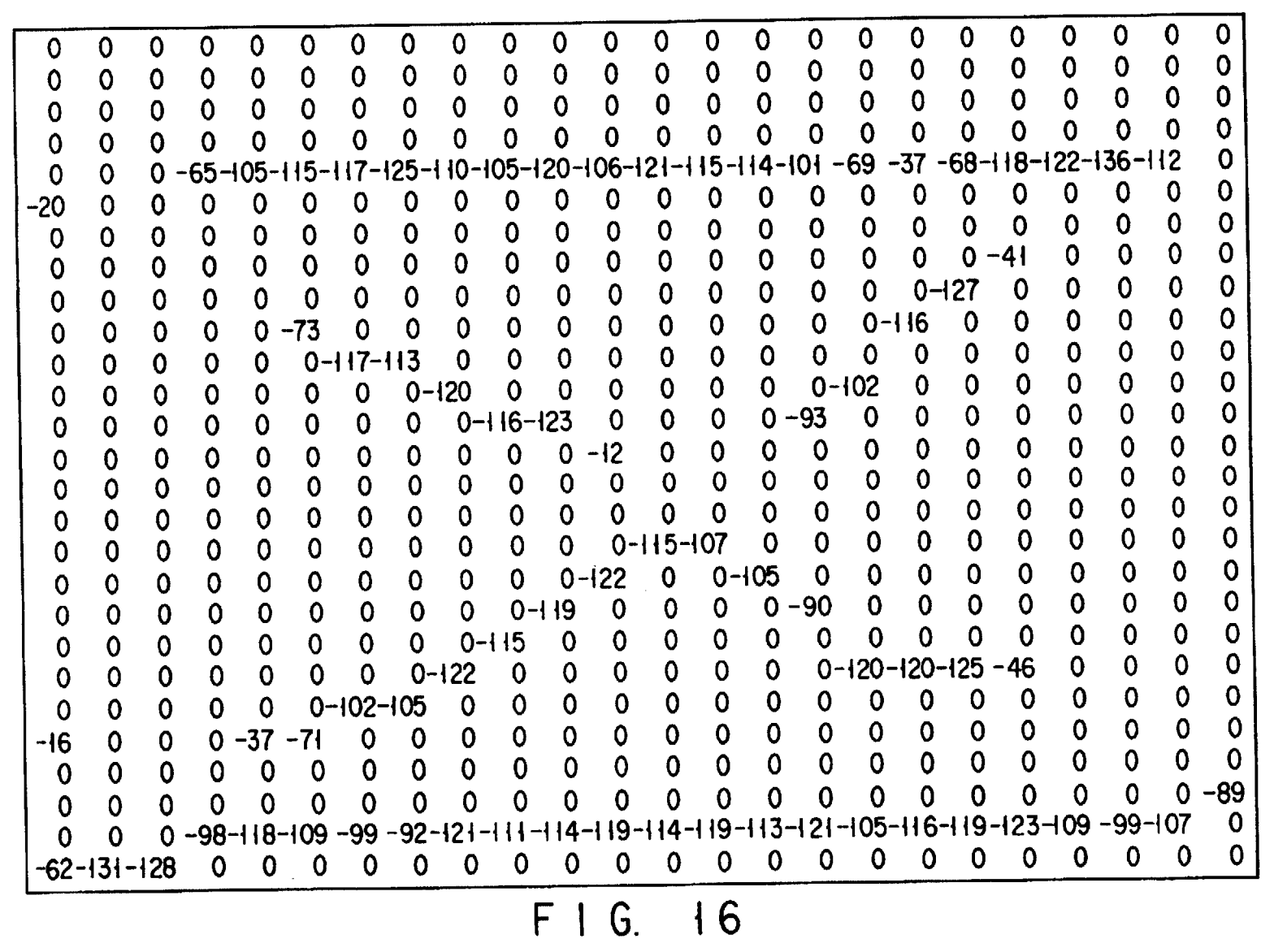

Because the sensing point is shifted one pixel at the falling point with respect to the rising point, owing to the nature of the supposed masks, a position correction is made to move the sensing point back a single pixel in the X or Y negative direction, when the obtained differential value is negative as shown in FIGS. 14 and 16. In the position correction, with a 3×3 mask as shown in FIG. 4 being used as a differential mask, when the differential value is positive, the sensing point must be shifted one pixel in the positive direction; when the differential value is negative, the sensing point must be shifted one pixel in the negative direction. Therefore, the position correction depends on the nature of the masks used for differential value computations.

Figure 17:
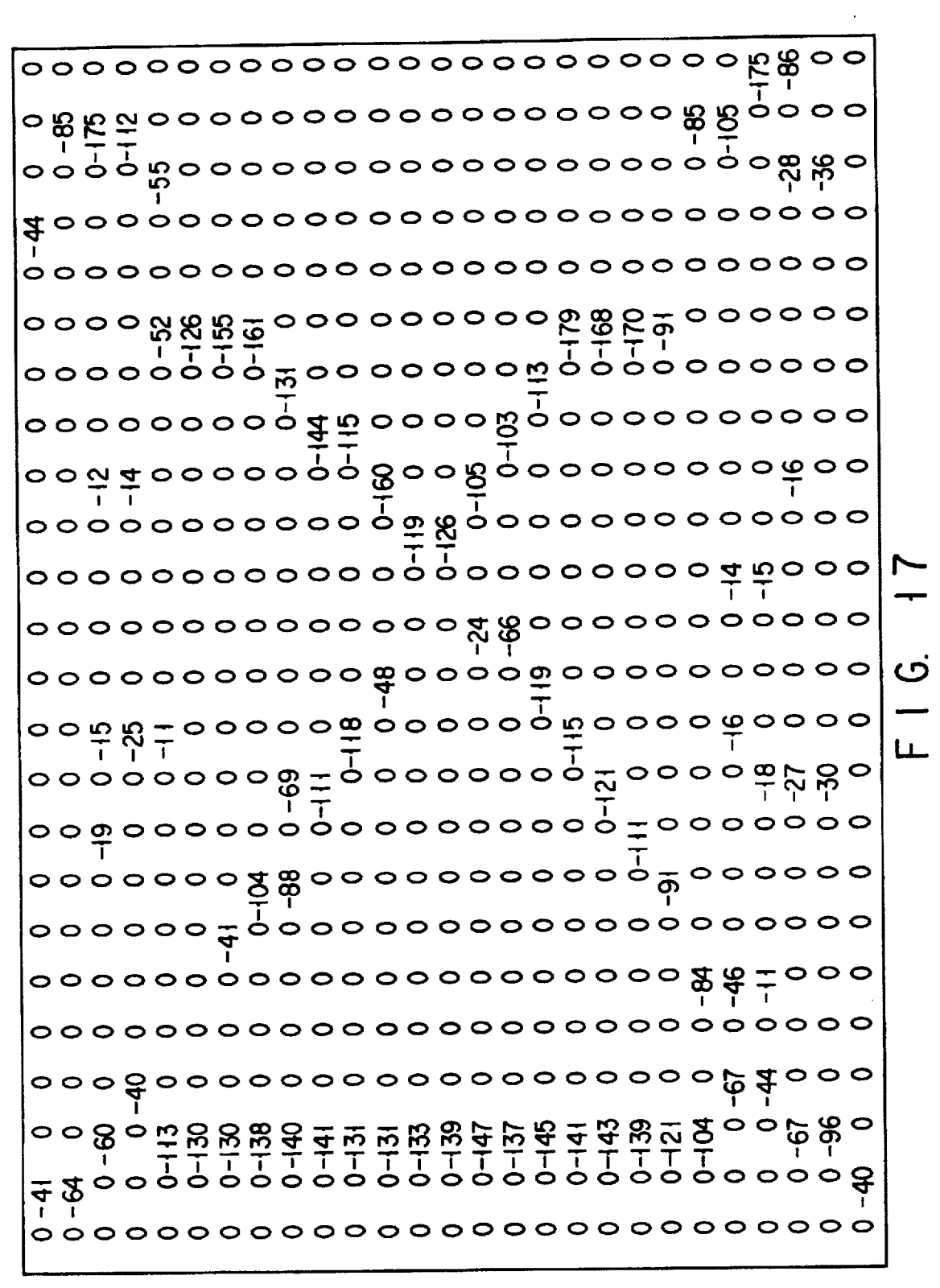
Figure 18:
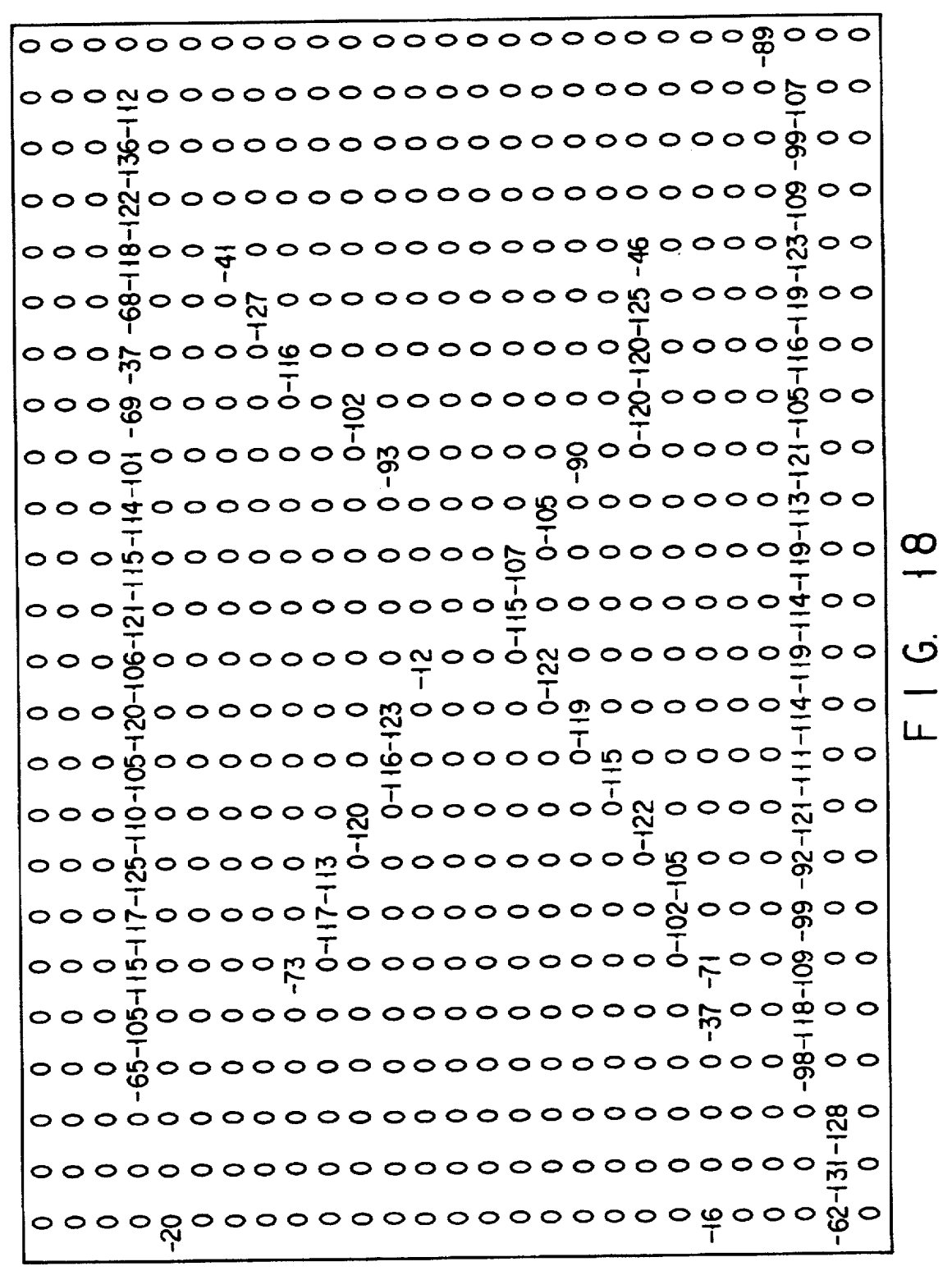
Figure 19:
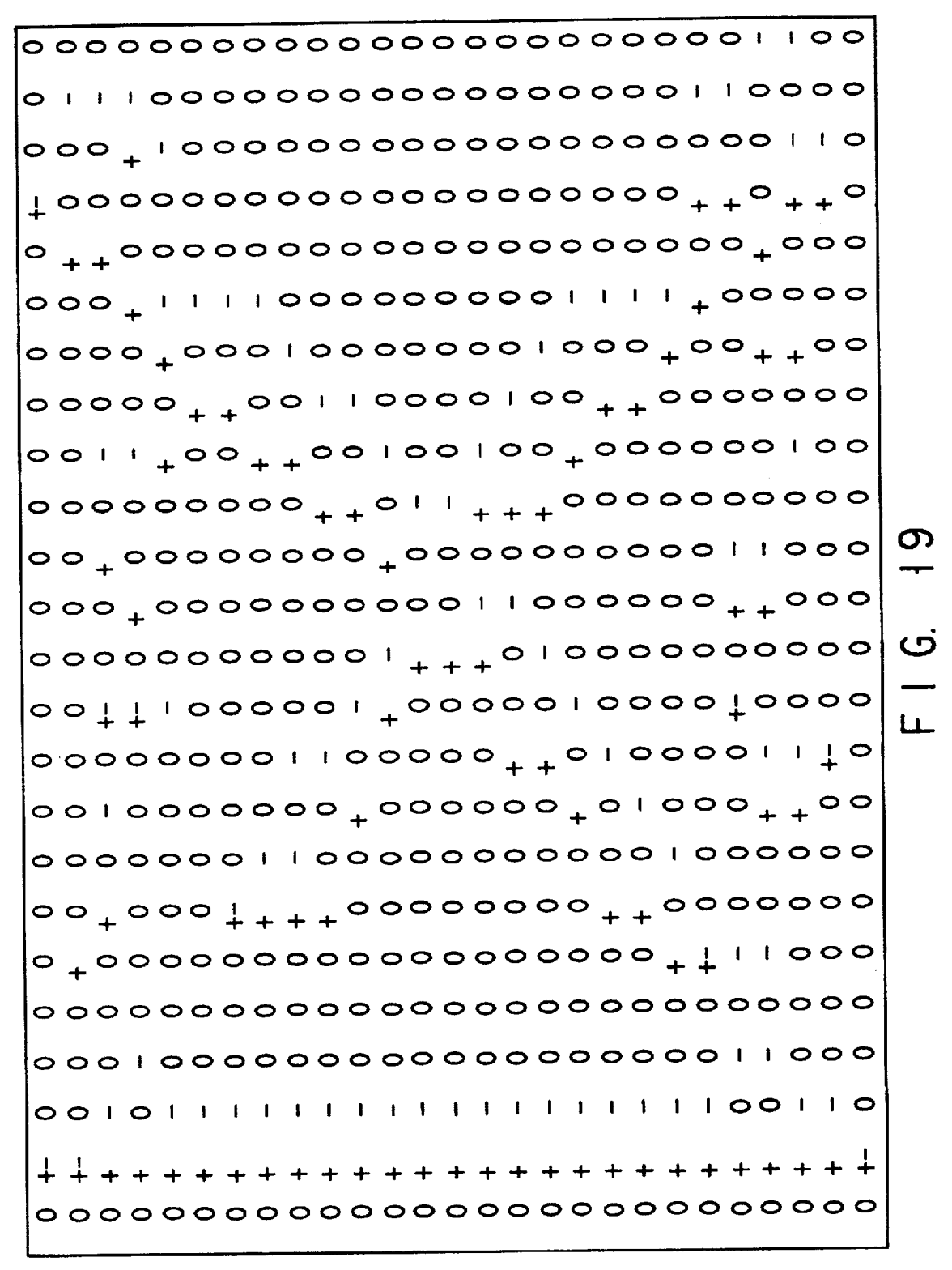
Figure 20:
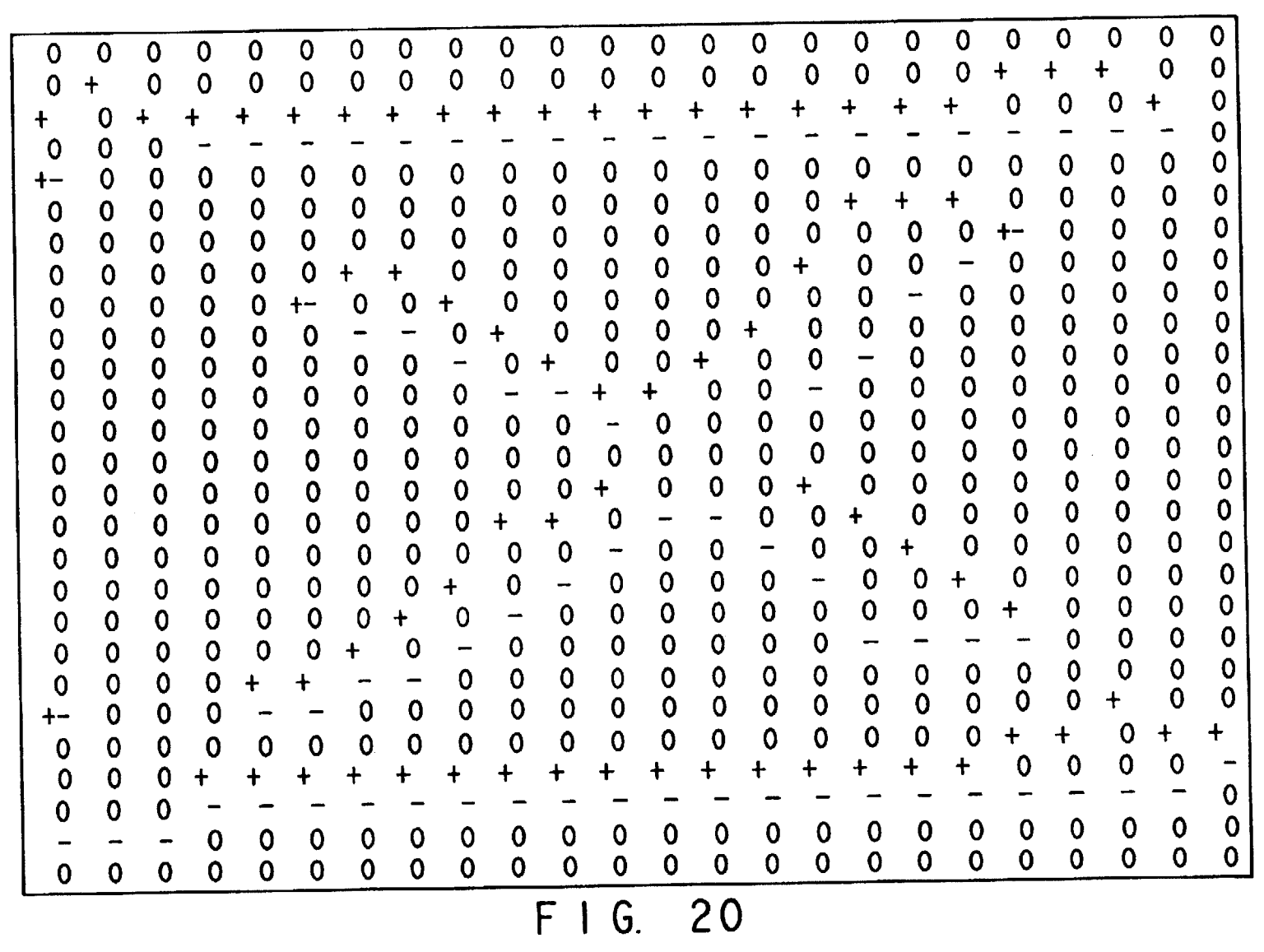

The falling peak images in the X and Y directions after the positions have been corrected using [−11] and [−11]T as differential masks, are shown in FIGS. 17 and 18, respectively. As shown here, the differential maximum or minimum can have both a positive value and a negative value for a single pixel. Whether the X-direction differential peak value is either positive or negative is represented by + or −, thereby forming a conceptual diagram shown in FIG. 19. A pixel without a peak is determined to be 0. Similarly, a conceptual diagram related to the Y direction is shown in FIG. 20. From these two conceptual diagrams, the feature of differential peaks can be represented by the presence/absence of four types of pieces of information on a single pixel.

Figure 21:
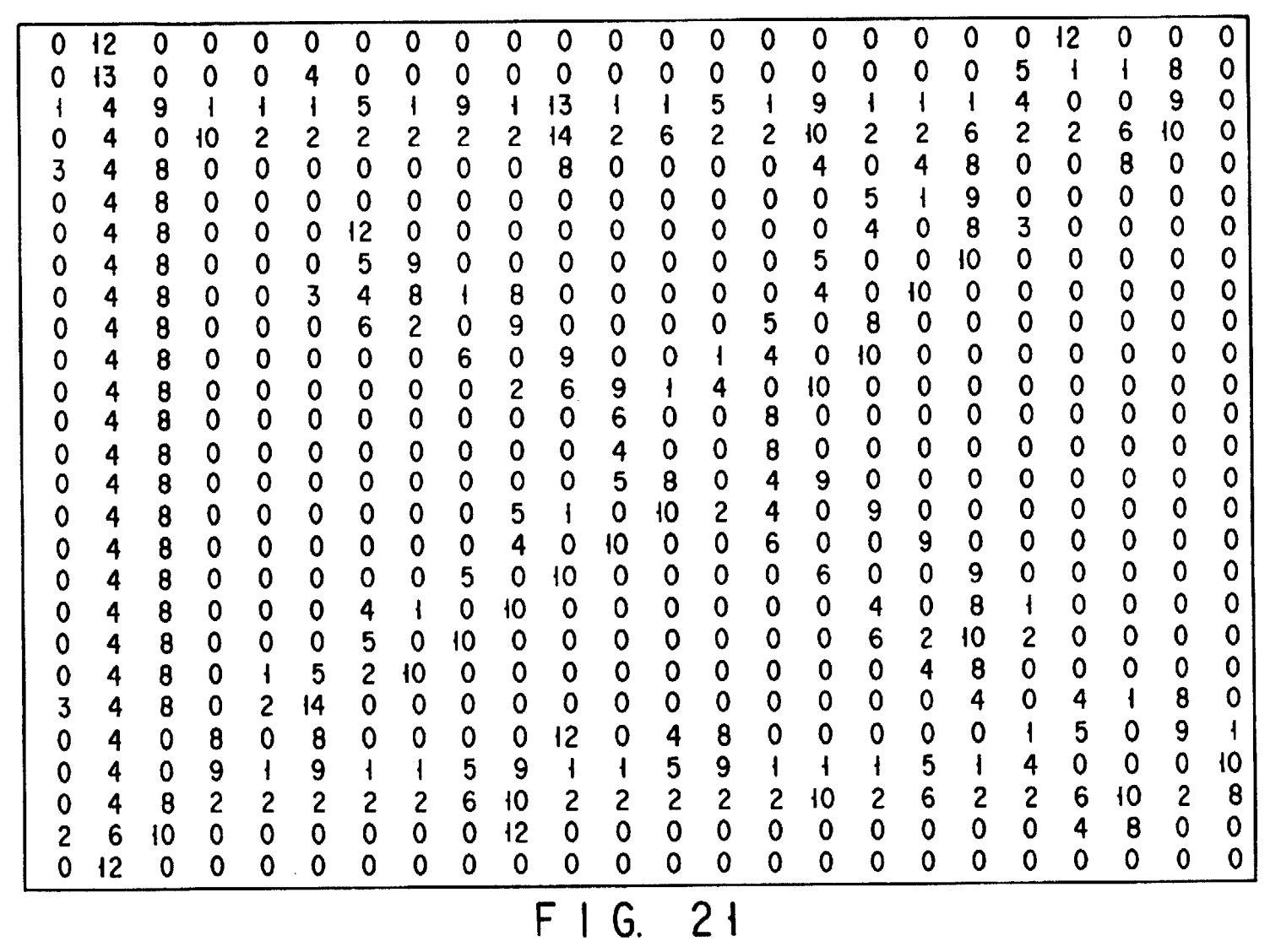

In FIG. 3, in the direction code allocation process at step S4, 4-bit codes as shown in FIG. 8 are allocated to the individual pixels in the target image according to the presence/absence of the four different pieces of differential information. What is obtained in this way is a 4-bit direction code image as shown in FIG. 21, provided that the value of a 4-bit direction code ranges from 0 to 15. The direction code image is also sent directly to the character recognition section 7.

Figure 22:
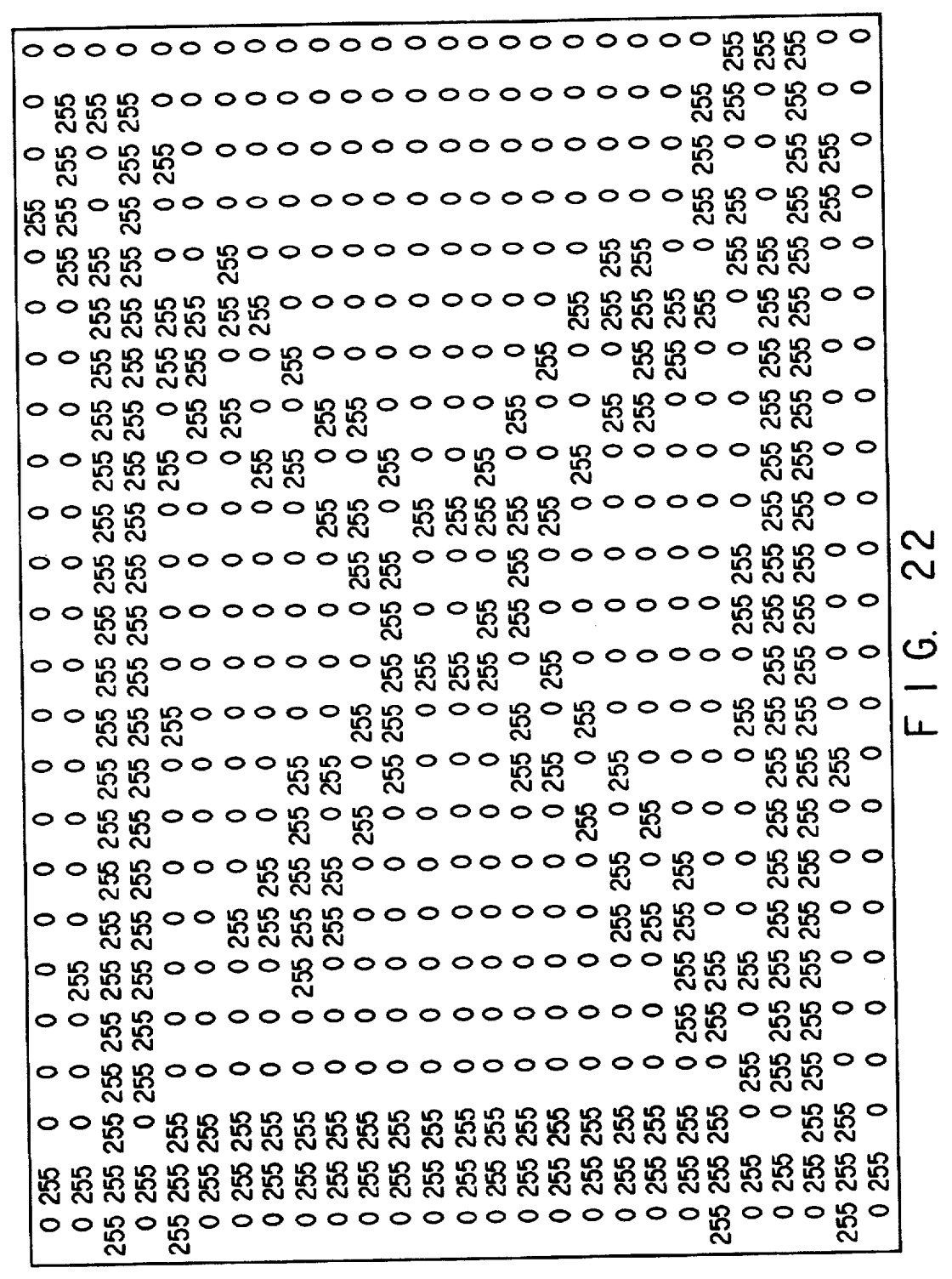

Next, in the binary edge extracting process at step S5, the direction code image is binarized, depending on whether a point has a value of 0 or not, thereby producing a binary edge image as shown in FIG. 22.

The process of obtaining from a multi-valued image a direction code image with each pixel consisting of four bits, will be explained concretely, focusing on the pixel with a direction code of 13, second from the top and second from the left ("1101" in 4-bit representation). The target point in the multi-valued image of FIG. 10 has a density of 164. Differential values in the vicinity are . . . , 0, 164,−64,−62, −38, . . . from left to right in the X direction in FIG. 11, and . . . , 41, 123, 71, 5, . . . from top to bottom in FIG. 12. It is assumed that the differential process is carried out after a small the amount of noise whose density is below 30 has been removed by adding a groundwork process to the multi-valued image.

The peaks of the rising differential values in the X direction are extracted from FIG. 13, giving . . . , 0, 164, 0, 0, 0, . . . . The peaks of the falling differential values in the X direction are extracted from FIG. 14, giving . . . , 0, 0, −64, 0, 0, . . . . Similarly, the peaks of the rising differential values in the Y direction are . . . , 0, 123, 0, 0, . . . as shown in FIG. 15. The peaks of the falling differential values in the Y direction are 0, 0, 0, 0, . . . . In this vicinity, because no falling in the Y direction is sensed, each pixel has a value of 0. Here, it is assumed that the rising peak indicates a case where in three points including the right and left pixels, the differential value of the central pixel is maximum and larger than the preset threshold value. Similarly, it is assumed that the falling peak indicates a case where the differential value of the central pixel is minimum and smaller than the preset threshold value. These assumptions hold true for the Y direction. In this example, "10" is used for rising and "−10" is used for falling. In this case, when a differential value lies between "−10" and "10", it will not be sensed as the peak.

Next, the rising peak is corrected. In the case of the target pixel, because the falling components are sensed only in the differential values in the X direction, the falling components are shifted one pixel in the negative X direction (to the left), giving . . . , 0, −64, 0, 0, . . . as shown in FIG. 17. For the Y direction, 0, 0, 0, . . . are given as shown in FIG. 18, because the pixel does not have a falling peak.

Therefore, the target point has a differential peak value of −64 in the negative X direction, a differential peak value of 164 in the positive X direction, a differential peak value of 0 in the negative Y direction, and a differential peak value of 123 in the positive Y direction. Thus, by giving "0" or "1", depending on whether the values are 0 or not in this sequence, the direction code at this point will become "1101" ("13" in figures). What is obtained by performing such a conversion on the entire character area is shown in FIG. 21, as describe above.

Figure 6:
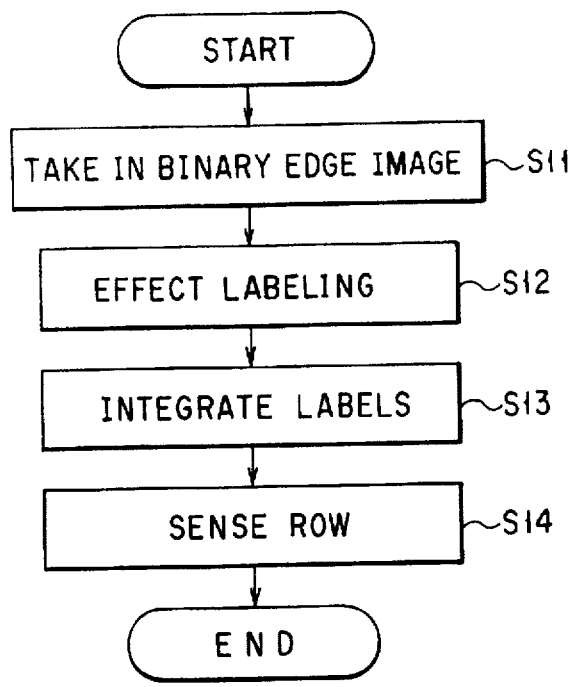
FIG. 6 is a flowchart to help explain the processing at a row sensing circuit.

FIG. 6 is a flowchart of the processing at the row sensing circuit 4, which senses row areas on the basis of the binary edge images (FIG. 22) created by binarizing a direction code image at the edge extracting circuit 3. Hereinafter, the processing based on the flowchart will be explained.

First, at step S11, the binary edge image is taken in from the edge extracting circuit 3, and control goes to step S12. In the labeling process at step S12, the process of concatenating pixels adjacent to four vicinities or eight vicinities of each pixel in the binary edge image, is repeated to produce a concatenated area. Here, the obtained concatenated areas or area is called an initial label. Then, in the label integration process at step S13, on the basis of the distance between adjacent labels and the label shape, labels that can be considered to be a row are integrated into a single label. The process is repeated until the labels to be integrated have run out. Here, the thus obtained labels or label is called the final label. Next, in the row sensing process at step S14, the coordinate values for the row area are computed on the basis of the initial label data and the final label data.

The addressee area sensing circuit 5 computes the coordinates of the area appearing to be the addressee area by integrating the row areas on the basis of the coordinate values obtained at the row sensing circuit 4 and each label data item.

Figure 5:
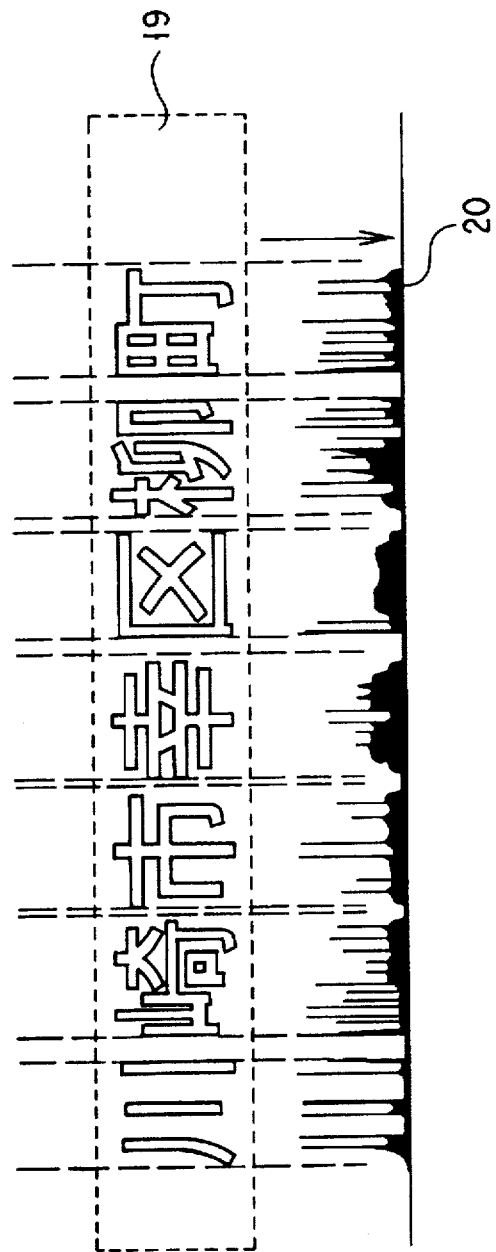
FIG. 5 is a drawing to help explain the creation of projection information used in a character sensing/segmenting circuit.

For each row in the addressee area obtained at the addressee area sensing circuit 5, the character sensing/segmenting circuit 6, like the row sensing circuit 4, senses and segments an area for each character on the basis of the size, shape, and position of the label data, and the projection information 20 on the direction perpendicular to row 19 in the binary edge image as shown in FIG. 5.

Figure 7:
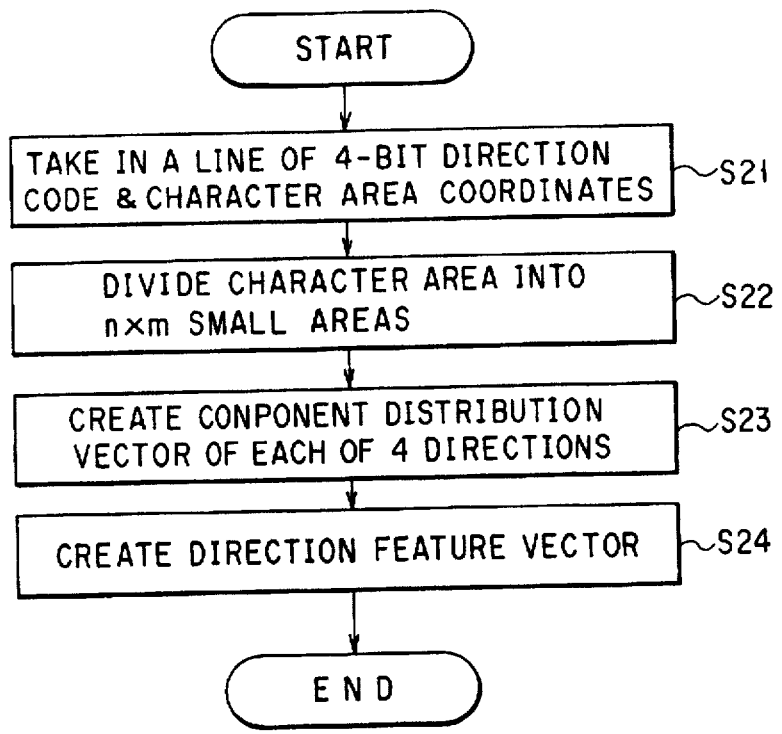
FIG. 7 is a flowchart to help explain the processing at a direction feature vector creating circuit.

FIG. 7 is a flowchart of the processing at the direction feature vector creating circuit 8, which creates an input vector for similarity computation from the 4-bit direction code image and the coordinate information about each character area obtained at the character sensing/segmenting circuit 6. Hereinafter, the processing based on the flowchart will be explained.

First, at step S21, a line of 4-bit direction code image and character area coordinate information are taken in, and control proceeds to step S22. The process of dividing into n×m small areas at step S22 is required because the size of each character area is not normalized. All of the character areas obtained at the character sensing/segmenting circuit 6 are not necessarily of the same size, even if what is to be recognized is printing type. Therefore, although the small areas formed vary in size, dividing is effected so that they may be prevented from clustering to one side as much as possible.

When the size of each character area is normalized, calculations for dividing into small areas are not necessary, if the size of character areas after normalization is related to the number of small areas "n×m". This process, however, requires a suitable device because computing time for normalization is necessary and there is a strong possibility that distortions due to normalization will occur in the edge image.

Next, in the process of creating the distribution vector of each of the four directions, how many components in each of the directions, height, width, right-rising inclination, and left-rising inclination, exist in each of n×m small areas is determined according to, for example, a conversion table shown in FIG. 8, on the basis of the 4-bit direction code given to each pixel at the edge extracting circuit 3.

Figure 27:
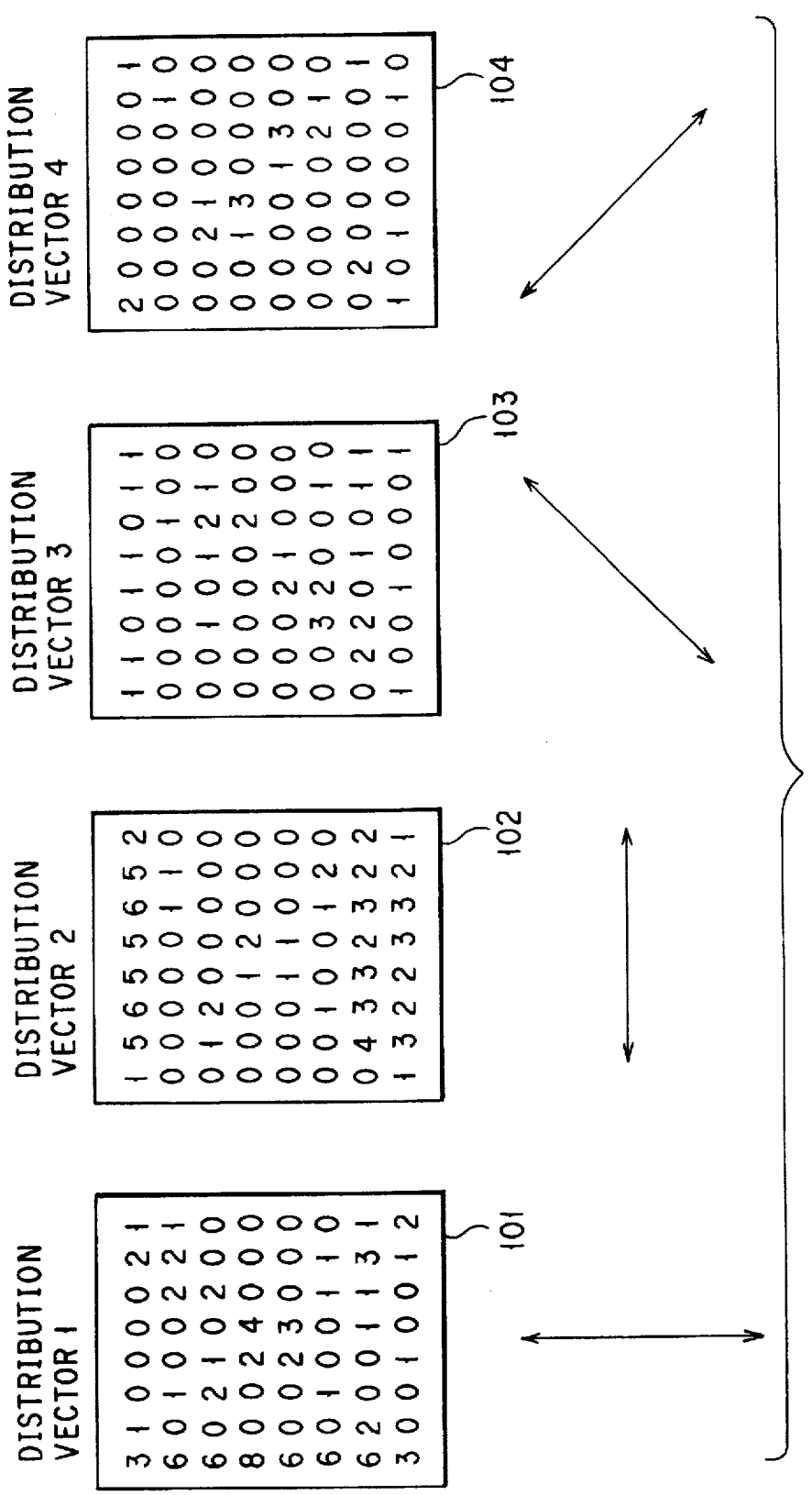
FIG. 27 shows an example of direction component distribution vectors indicating the distribution of four direction components.

FIGS. 23 to 26 show images obtained by extracting each of the four direction components independently from the direction code image of FIG. 21 according to a conversion table as shown in FIG. 8. What are obtained by counting the number of components in each small area in FIGS. 23 to 26 are distribution vectors 1 to 4 in FIG. 27. In this example, it is assumed to be n=m=8.

Then, in the process of creating direction feature vectors at step S24, the four n×m-dimensional direction component distribution vectors obtained at step S23 are connected to each other to produce an n×m×4-dimensional direction feature vector, which is outputted to the similarity computing circuit 9.

In a case where normalization is not performed, if the characters to be recognized are small or the density of the image to be recognized is low, the number of components obtained in each divided small area in each character area is very small, resulting in a danger of preventing similarity from being computed properly. Conversely, when the character area to be recognized is large, there is a possibility that a vector with a value larger than the expected value will be obtained.

Figure 9:
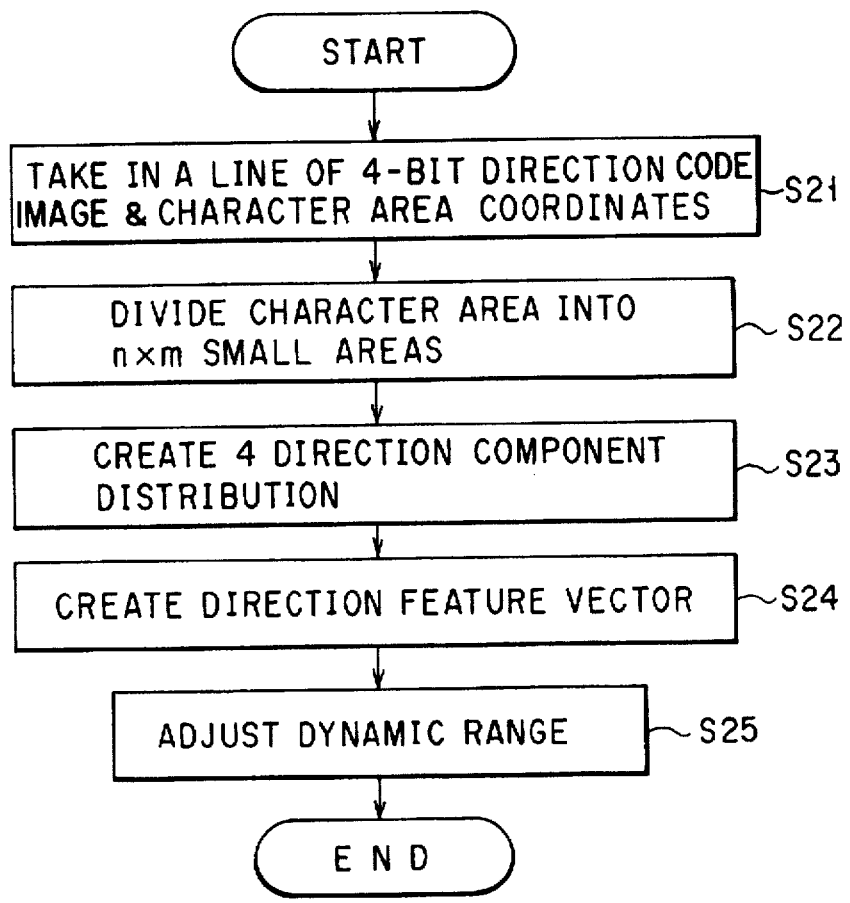
FIG. 9 is a flowchart of the direction feature vector creating circuit to help explain a case of dynamic-range adjustment.

In that case, in the processing at the direction feature vector creating circuit 8, the process based on the flowchart shown in FIG. 9 may be used, instead of the above-described flowchart in FIG. 7. Specifically, steps S21 to S24 are the same processes as those in FIG. 7 and furthermore, added with a dynamic range adjusting process at step S25. In the dynamic range adjusting process, after the direction feature vectors have been created at step S24, the maximum value MAX—V of the vector values is determined and adjusted to a predetermined dynamic range MAX_D. Both of MAX_V and MAX_D are positive numbers. The calculation is done by multiplying each vector value by MA_D and then dividing each result by MAX_V. By doing this, errors due to disregarding fractions are less than "1".

The similarity computing circuit 9 receives the n×m×4-dimensional direction feature vector obtained at the direction feature vector creating circuit 8 and produces a recognition result by, for example, a complex similarity method, in this example. A dictionary (standard patterns) 10 necessary for similarity calculation is previously designed off-line.

The computation result from the similarity computing circuit 9, that is, the recognition result from the character recognition section 7, is supplied to the knowledge processing section 11 composed of the town name/district recognition circuit 12 and addressee recognition circuit 14. The knowledge processing section 11 collates the recognition result obtained at the similarity computing circuit 9 with the town name, district, and addressee dictionary 13 in which the town names, districts, and addressees in the division areas allocated to the present reading apparatus have been entered in words and phrases. The knowledge processing section thereby determines the addressee and outputs it as division specifying information.

Hereinafter, a second embodiment of the present invention will be explained.

Figure 28:
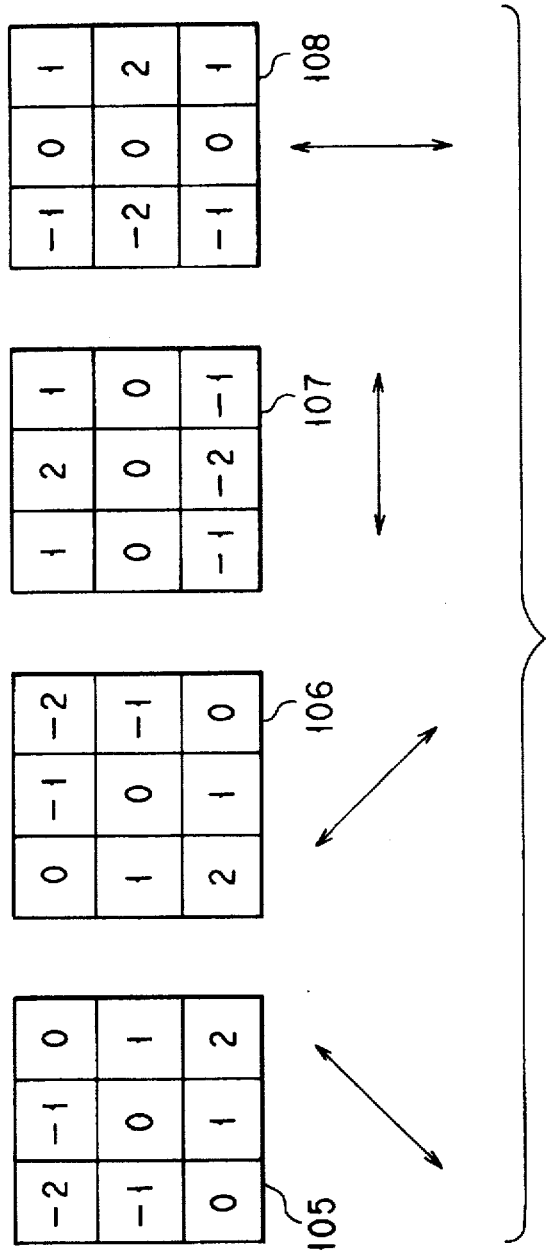
FIG. 28 shows an example of four types of masks for extracting direction component used in a second embodiment of the present invention.

In the first embodiment, a character area for each character is sensed and segmented from the inputted multi-valued image via a 4-bit direction code image, and a direction feature vector representing the distribution of direction components is created via the 4-bit direction code as well. However, by using four types of masks as shown in FIG. 28, a direction components code image of 4 direction components can be formed from the multi-valued image. The code image is different from the aforementioned 4-bit direction code image. In this case, the direction component code of each point is constructed by low rank 3-bits indicating any one of the four types of direction components and one bit indicating information as to whether it is rising or falling. Namely, the code is different from the direction code of the first embodiment, a single point never has more than one type of direction component.

FIG. 29 shows a processing circuit that produces the 4 bit edge direction component code images from the inputted multi-valued image (another concrete example of the important portion of the edge extracting circuit 3 in FIG. 1). The value and sign of each direction component are computed from the target pixel and multi-valued density images in eight vicinities. First, the inputted multi-valued density image is sent to four types of 3×3 mask circuits 23, 24, 25, and 26 directly, or via a delay circuit 21, or delay circuits 21 and 22. The signal passed through the delay circuits 21, 22 sum of k times becomes the data k lines before.

The four mask circuits 23, 24, 25, and 26 each produce integral values with the signs of the integral values indicating whether the polarity is rising or falling and the absolute values of the integral values representing the strength of the direction components in the target pixel.

Sign extracting circuits 27, 28, 29, and 30 extract only the sign bits of the individual direction component values, MSB1 to MSB4, from the mask outputs from the mask circuits 23, 24, 25, and 26, and send these to a selector 31. Absolute value extracting circuits 32, 33, 34, and 35 extract only the absolute values of the individual mask outputs from the mask circuits 23, 24, 25, 26, and send these to comparators 36 and 37 and selectors 38 and 39.

The two values selected from the four values at the selectors 38, 39 are sent to a comparator 40, which compares the two values. Thereafter, a selector 41 finally selects the largest absolute value from the four values. The maximum value is sent to a comparator 42, which finally compares it with a threshold value TH. The result is one of the input signals to a ROM 43.

In addition to the 1-bit signal, each of the comparators 36, 37, 40 sends a bit of signal to the ROM 43, which therefore receives a total of four bits of signals. According to the input of these four bits of signals, the ROM 43 outputs 3-bit OUTPUT as shown in FIG. 30, for example. The selector 31 receives three bits excluding the signal from the comparator 42 from the four bits of input to the ROM 43, selects the sign corresponding to the component selected at the ROM 43, and outputs the sign (1-BIT).

Therefore, for example, a 4-bit signal where low-order three bits of direction components are added with a bit of sign in the high order is outputted as a direction component code for a single pixel. The direction component code differs from the direction code in the first embodiment in terms of information.

As described above, according to the first and second embodiments, as compared with the case where the features of the edge are captured from a conventional binary image and inputted for recognition, the accuracy of feature extraction is improved remarkably because adjacent features are obtained from the multi-valued levels. Therefore, the character recognition capability can be improved over a wide range of image density. Furthermore, by obtaining a direction code image or the direction component code image, directly from a multivalued image, the identification process can be performed using the same image information as in character image extraction. Because a mask smaller than 2×2 mask is able to be used in direction component sensing, details in the direction components are less likely to be lost, contributing to improvements in the recognition rate. Additionally, because the amount of preprocessing calculations can be reduced, the recognition speed can be improved and the apparatus can be made smaller.

Hereinafter, a third embodiment of the present invention will be explained.

FIG. 31 schematically shows the configuration of a postal-matter addressee reading apparatus to which a character recognition system according to the third embodiment is applied. The same parts as those in the first embodiment of FIG. 1 are indicated by the same reference symbols and their detailed explanation will be omitted. Only the parts differing from the first embodiment will be explained in detail. The third embodiment differs from the first embodiment of FIG. 1 in that a binarizing circuit 15 is added, and a density distribution vector creating circuit 16 and a feature vector creating circuit 17 are added to the character recognition section 7.

Specifically, the binarizing circuit 15 converts the multi-valued image inputted at the photoelectric conversion section 1 into a binary image by binarizing the multi-valued image, and sends the converted image to the density distribution vector creating circuit 16. An example of the binary image is shown in FIG. 32, which is obtained by binarizing the multi-valued image of FIG. 10.

The direction feature vector creating circuit 8 converts the area for each character obtained at the character sensing/segmenting circuit 6 into direction feature vectors indicating the distribution of each of the four directions, height, width, right-rising inclination, and left-rising inclination, on the basis of the edge direction code image obtained at the edge extracting circuit 3. The direction feature vector creating circuit sends the vectors to the feature vector creating circuit 17.

Figure 32:
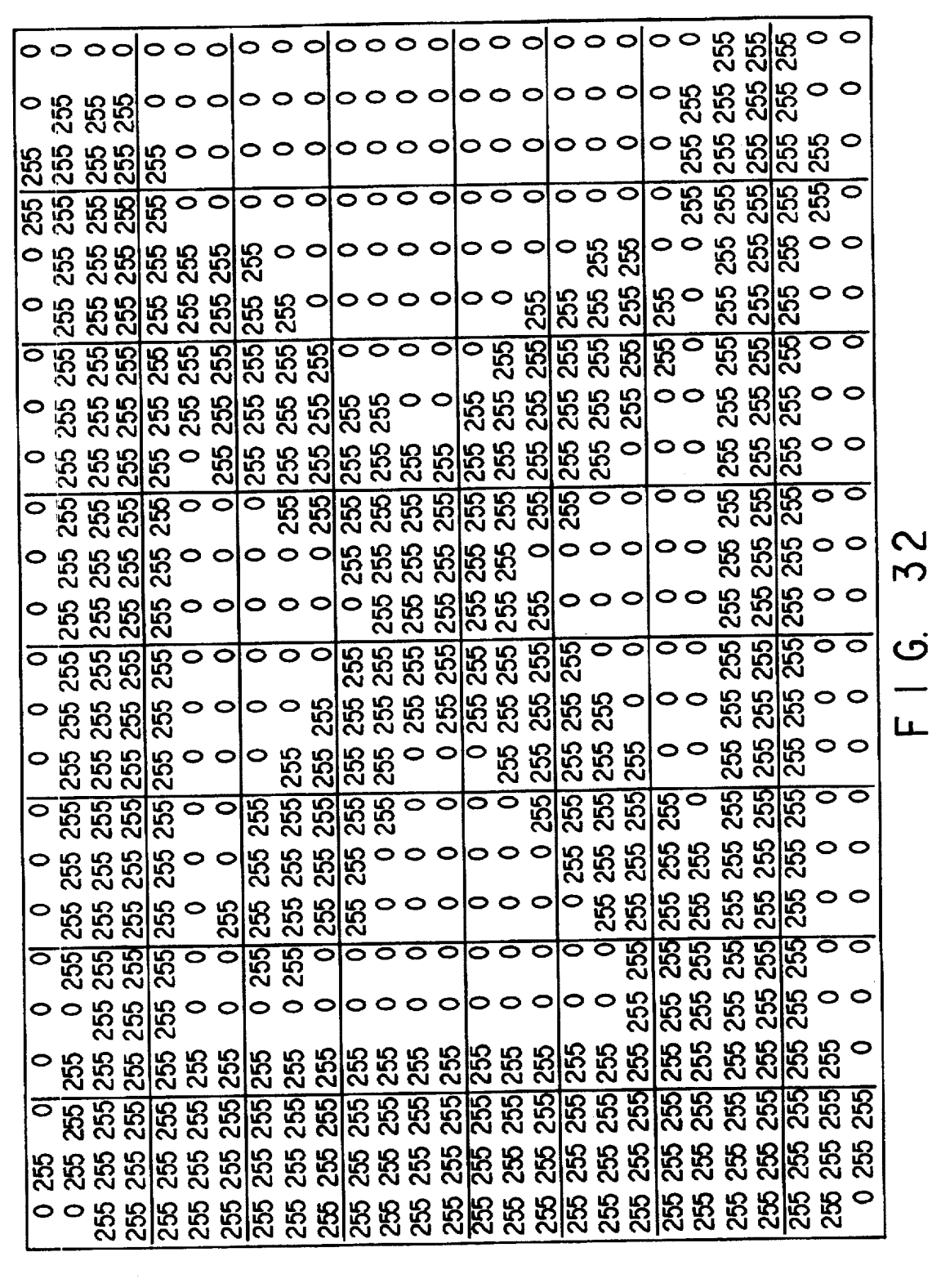

The density distribution vector creating circuit 16, like the direction feature vector creating circuit 8, creates a density distribution vector by dividing a character area for one character into n×m pieces so as not to cluster to one side, using a binary image (density image) as shown in FIG. 32 created at the binarizing circuit 15 and the coordinate data on the character area obtained from the character sensing/segmenting circuit 6, and counting black pixels in each small area.

Specifically, as shown in the flowchart of FIG. 33, at step S31, a line of density image and coordinate information on the character area are taken in, and control goes to step S32. At step S32, as in the direction feature vector creating circuit 8, the process of dividing into n×m small areas is carried out and control proceeds to step S33. At step S33, by counting the number of black pixels in each of the small areas divided at step S32, a density distribution vector is created, which is sent to the feature vector creating circuit 17.

FIG. 34 shows an example of the density distribution vector created at the feature vector creating circuit 17, which has created it from the binary image of FIG. 32.

In the density distribution vector creating circuit 16, the dynamic range can be adjusted by the same process as in the direction feature vector creating circuit 8 explained in FIG. 1.

The feature vector creating circuit 17 just connects the direction feature vector created at the direction feature vector creating circuit 8 to the density distribution vector created at the density distribution vector creating circuit 16 to produce a single feature vector, and sends it to the similarity computing circuit 9.

The similarity computing circuit 9 receives the feature vector (n×m×5-dimensional feature vector) from the feature vector creating circuit 17 as an input vector, performs character recognition by a complex similarity method using a character recognition dictionary (standard pattern) 10 previously designed off-line, and sends the recognition result to the knowledge processing section 11.

Hereinafter, a fourth embodiment of the present invention will be explained.

In the third embodiment, a character area for each character is sensed and segmented from the inputted multi-valued image via a direction code image obtained through X and Y direction differentials, and a direction feature vector representing the distribution of the four direction components is created via the direction code image as well. However, by using four types of 3×3 masks as shown in FIG. 28, the direction component code image indicating the 4 direction components can be extracted directly from the multi-valued image without using the aforementioned 4-bit direction code image. In this case, only any one of the four types of direction components and information as to whether it is rising or falling are given to each point. Namely, a single point never has more than one type of direction component.

In this case, the arrangement of the entire apparatus is the same as that in FIG. 31 as in the third embodiment, except that an important portion of the edge extracting circuit 3 differs from that of the third embodiment. As in the second embodiment, the edge extracting circuit shown in FIG. 29 can be used here, and therefore, its explanation will be omitted.

Figure 35:
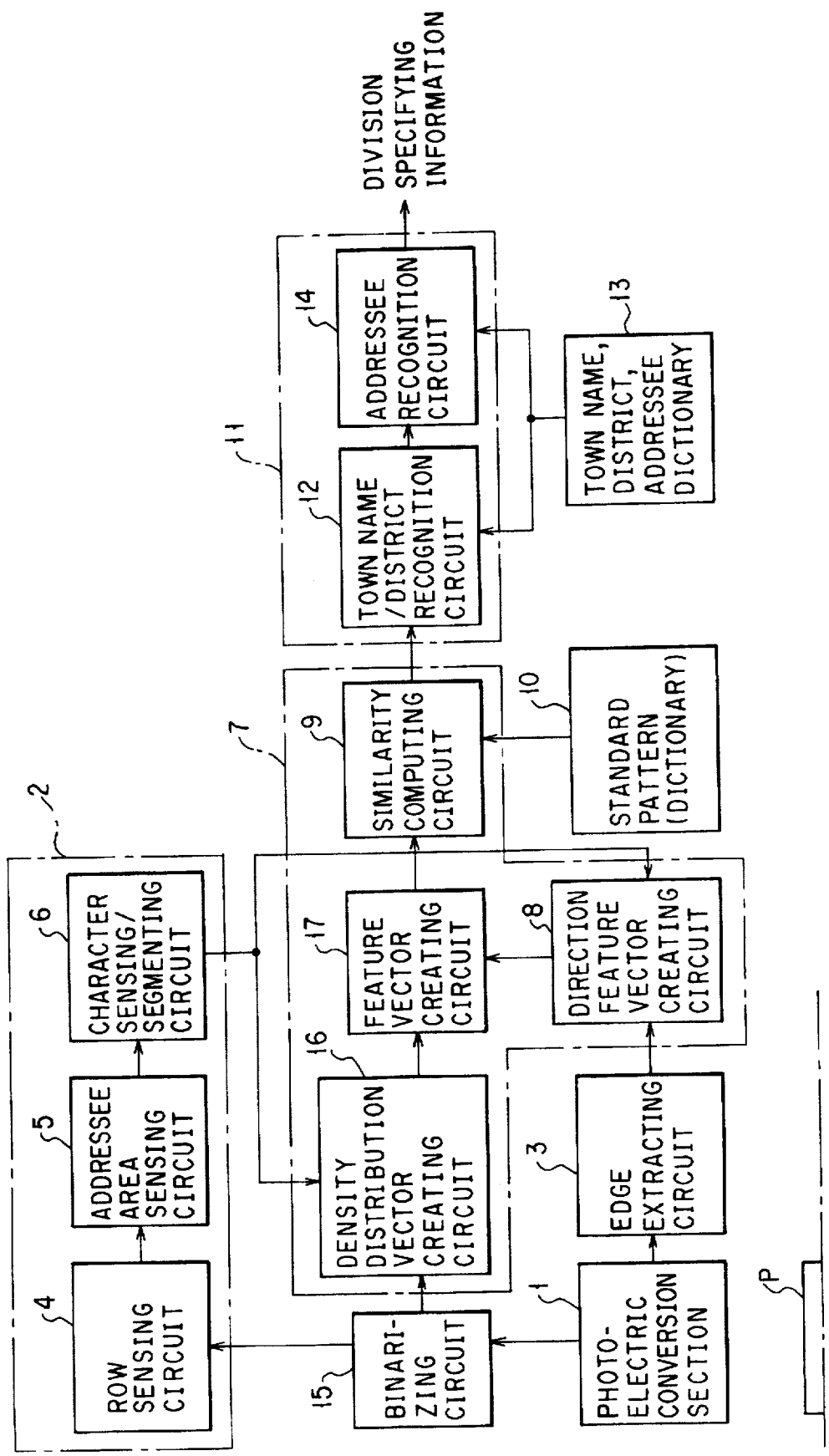
FIG. 35 is a schematic block diagram of a postal-matter addressee reading apparatus to which a character recognition system according to a fifth embodiment of the present invention is applied.

FIG. 35 schematically shows the configuration of a postal-matter addressee reading apparatus to which a character recognition system according to the fifth embodiment is applied. The same parts as those in the third embodiment of FIG. 31 are indicated by the same reference symbols and their detailed explanation will be omitted. Only the parts differing from the third embodiment will be explained in detail. The fifth embodiment differs from the third embodiment of FIG. 31 in that the binarizing circuit 15 and the edge extracting circuit 3 are reversed in position. Although the information used in the character area sensing/segmenting section 2 is only the edge information in the third embodiment, it is only the binary image information in this embodiment. The advantage of this embodiment is that when the edge information cannot be obtained by any means, but some piece of binary image information has been obtained, character areas can be sensed and segmented.

Next explained will be a sixth embodiment of the present invention.

The sixth embodiment uses the edge extracting circuit shown in FIG. 29 in the fifth embodiment as with the fourth embodiment. Therefore, its explanation will be omitted.

Hereinafter, a seventh embodiment of the present invention will be explained.

FIG. 36 schematically shows the configuration of a postal-matter addressee reading apparatus to which a character recognition system according to the seventh embodiment is applied. The same parts as those in the third embodiment of FIG. 31 are indicated by the same reference symbols and their detailed explanation will be omitted. Only the parts differing from the third embodiment will be explained in detail. The seventh embodiment differs from the third embodiment of FIG. 31 in that an image used in the character area sensing/segmenting section 2 is obtained from an edge and binary image combining circuit 18 which combines a binary edge image and a binary image.

The advantage merit of this is that because sensing and segmenting information can be obtained from either the binary image or the edge image, stable sensing and segmenting can be effected.

Next explained will be an eighth embodiment of the present invention.

The eight embodiment is such that the edge extracting circuit of FIG. 29 is used in the seventh embodiment as in the fourth embodiment. Therefore, its explanation will be omitted.

Hereinafter, a ninth embodiment of the present invention will be explained.

FIG. 37 schematically shows the configuration of a postal-matter addressee reading apparatus to which a character recognition system according to the ninth embodiment is applied. The same parts as those in the third embodiment of FIG. 31 are indicated by the same reference symbols and their detailed explanation will be omitted. Only the parts differing from the first embodiment will be explained in detail. The ninth embodiment differs from the third embodiment of FIG. 31 in that an edge extracting and edge correcting circuit 19 is used instead of the edge extracting circuit 3 and a density image creating circuit 20 is used in place of the binarizing circuit 15.

The ninth embodiment differs widely from the third to eighth embodiments which obtain the density component distribution from binary images. In the ninth embodiment, the multi-valued image is not binarized at all and a density image corresponding to a binary image is formed at the density image creating circuit 20. The density image is created using the edge information extracted and corrected at the edge extracting and edge correcting circuit 19. From the density image, the density distribution vector creating circuit 16 produces a density distribution vector.

In this case, the character area sensing/segmenting section 2 also uses the edge information extracted and corrected at the edge extracting and edge correcting circuit 19 to sense and segment character areas. Because the sensing/segmenting section uses the corrected edge information, it can sense and segment character areas stably.

Hereinafter, the edge extracting and edge correcting circuit 19 in the ninth embodiment will be explained in detail.

Figure 38:
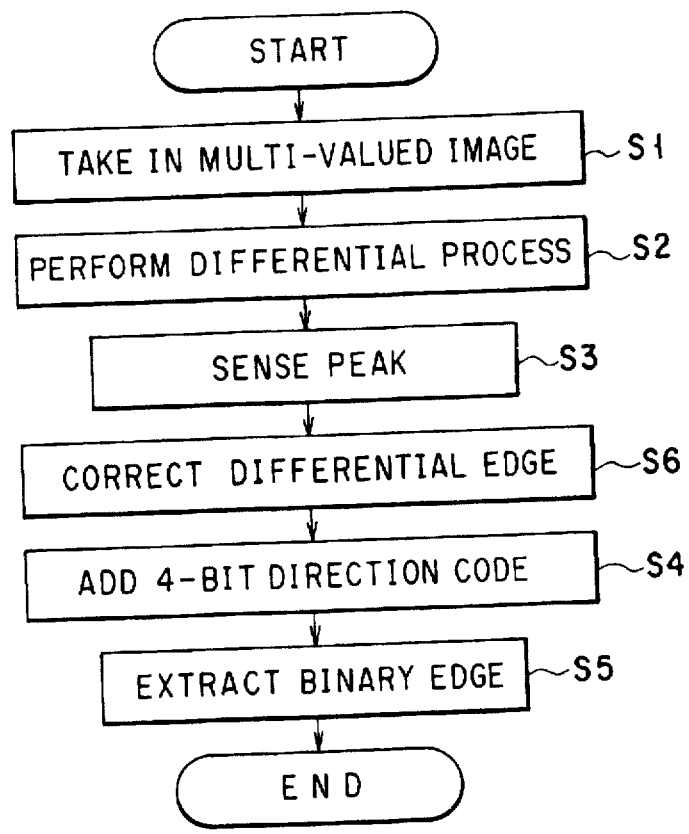
FIG. 38 is a flowchart to help explain the processing at an edge extracting/edge correcting circuit.

FIG. 38 is a flowchart of the processing at the edge extracting and edge correcting circuit 19. This circuit differs from the edge extracting circuit 3 in the above-described other embodiments in that there is a differential edge correcting process, which is carried out after the X and Y direction differential peaks have been sensed. Specifically, steps S1 to S3, S4, and S5 are the same as those in FIG. 3 and the differential edge correcting process at step S6 is added between step S3 and step S4.

Figure 39:
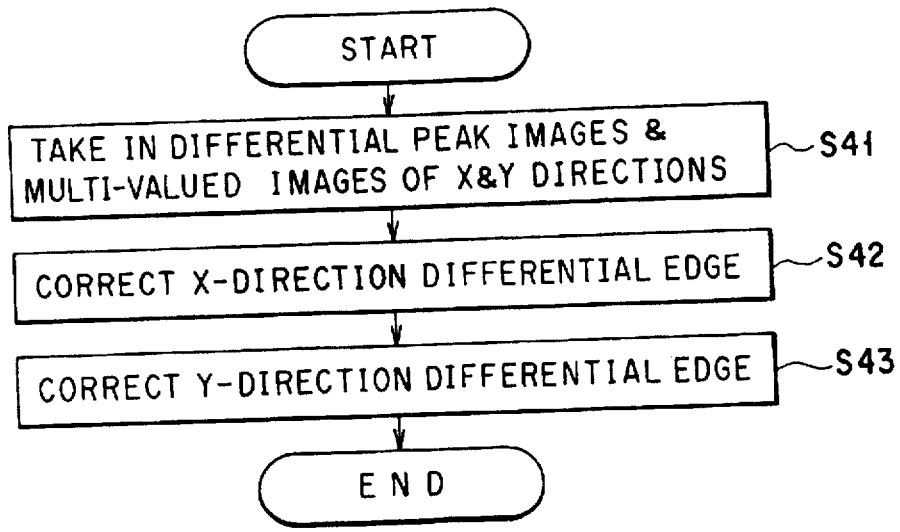
FIG. 39 is a flowchart to help explain the differential edge correcting process in FIG. 38.

The differential edge correcting process at step S6 is carried out according to the flowchart shown in FIG. 39. Specifically, first, after the differential peak images and multi-valued images in the X and Y directions have been read at step S41, an edge correction is made in each of the X and Y directions at steps S42 and S43, respectively.

Figure 40:
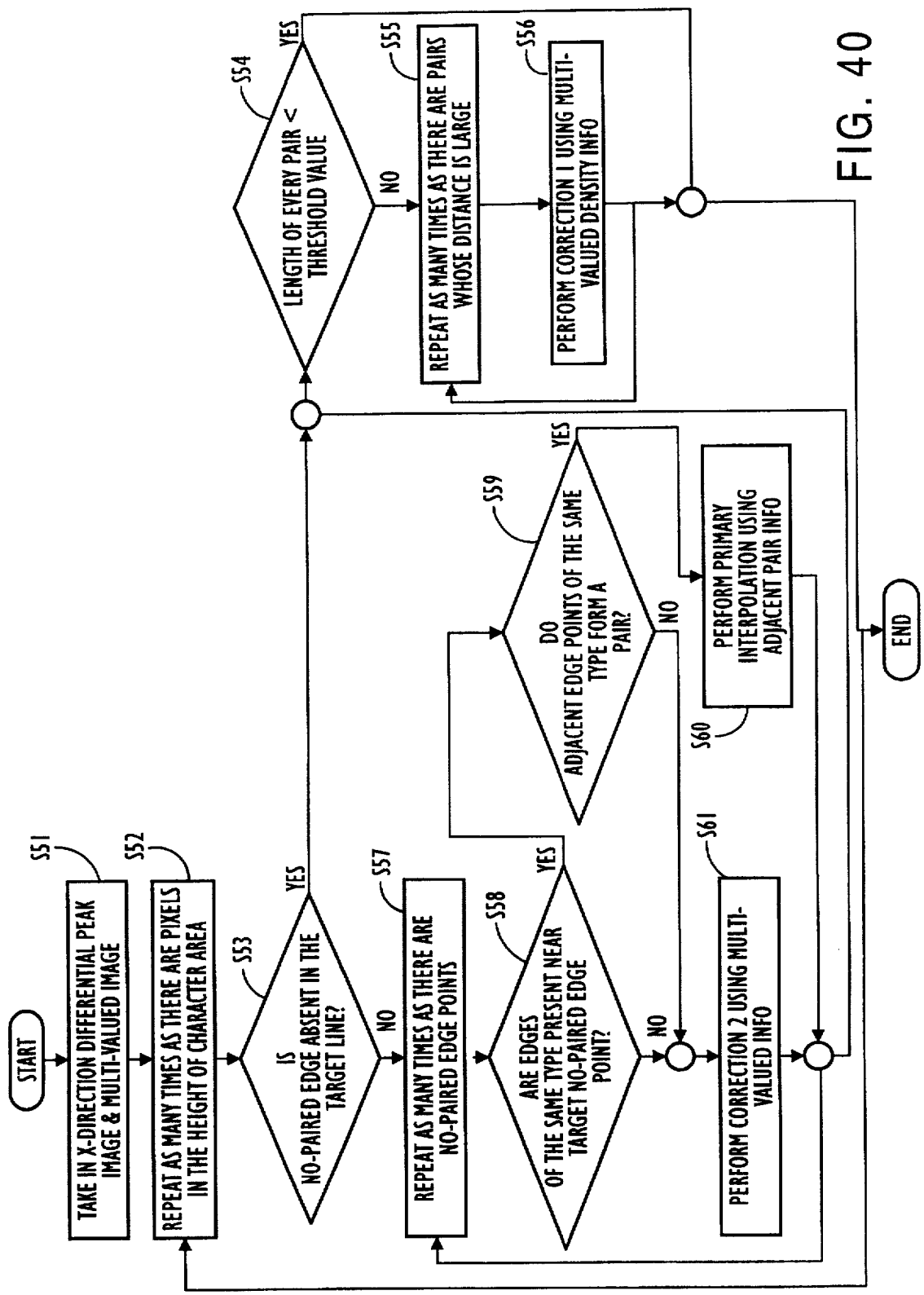
FIG. 40 is a flowchart to help explain the X-direction differential edge correcting process in FIG. 39.

The process of correcting the X-direction differential edge at step S42 is shown in the flowchart of FIG. 40. First, at step S51, the X-direction differential peak image and multi-valued image are read. Because a correction is made in the X direction, scanning is effected from top to bottom in the X direction. In this case, because the entire image is to be corrected, the process is repeated as many times as there are pixels in the height.

The edge correcting process for each row begins with condition judgment at step S53. In the condition judgment at step S53, rising edge points are paired with falling edge points in the target line from left to right, because rising is always followed by falling on account of the nature of the edge. Then, a check is made to see if there is any edge point that cannot be paired (here, such an edge is called a no-paired edge).

In the target line, when a no-paired edge point is not sensed, control goes to step S54. In the condition judgment at step S54, the distance across each pair formed in the target line is checked to see if it is larger than the preset threshold value.

When all the distances across the individual pairs in the target line are smaller than the threshold value, the formed pairs are determined to be the final edge. In the condition judgment at step 54, when there is a pair the distance across which is larger than the threshold value in the target line, the process of "correction 1 using multi-valued density information" at step S56 is carried out as many times as the number of pairs meeting the condition (S55).

For "correction 1 using multi-valued density information", in a concrete process of reproducing the edge that probably could not be sensed although should be sensed, if there is a multi-valued density point whose multi-valued density is lower than the multi-valued image density at the rising edge point across the target pair, the point closest to the rising point (the leftmost point) is determined to be a falling candidate point. If there is a multi-valued density point whose multi-valued density is lower than the multi-valued image density at the falling edge point across the target pair, the point closest to the falling point (the rightmost point) is determined to be a rising candidate point.

After these two processes, when both of the rising and falling candidate points exist across the target pair, and the rising candidate point is on the left of the falling candidate point, a new edge pair is formed using these edge candidates. The distance across the thus formed pair is still larger than the threshold value, the multi-valued information across the pair is checked again and corrected. This is repeated until the conditions (three conditions of multi-valued density, positional relationship, and pair structure) for a new edge point are not met or the pair length is smaller than the threshold value.

In the condition judgment at step S53, when a no-paired point is found in the target line, control proceeds to step S57, where the process of "correction 2 using multi-valued density information" or the process of "primary interpolation using adjacent edge pair information" is repeated as many times as the number of no-paired edge points. Which process should be carried out is determined according to the condition judgments at steps S58 and S59.

In the condition judgment at step S58, if there are edge points of the same type (if the target no-paired edge point is rising, it is of the rising type, and if the target no-paired edge point is falling, it is of the falling type) as the target no-paired edge point in the vicinity of the target no-paired edge point (certain limited ranges on the lines one line before and after the target point), in both of the lines above and below the target point, they are determined to be correction information candidate points. Furthermore, in the condition judgment at step S59, when both of these correction information candidate points constitute edge information pairs, these two edge information pairs are determined to be edge correction information. By using this, the edge point paired with the target no-paired edge point is subjected to primary interpolation. That is, the process of "primary interpolation using vicinity edge pair information" at step 60 is carried out.

Figure 41:
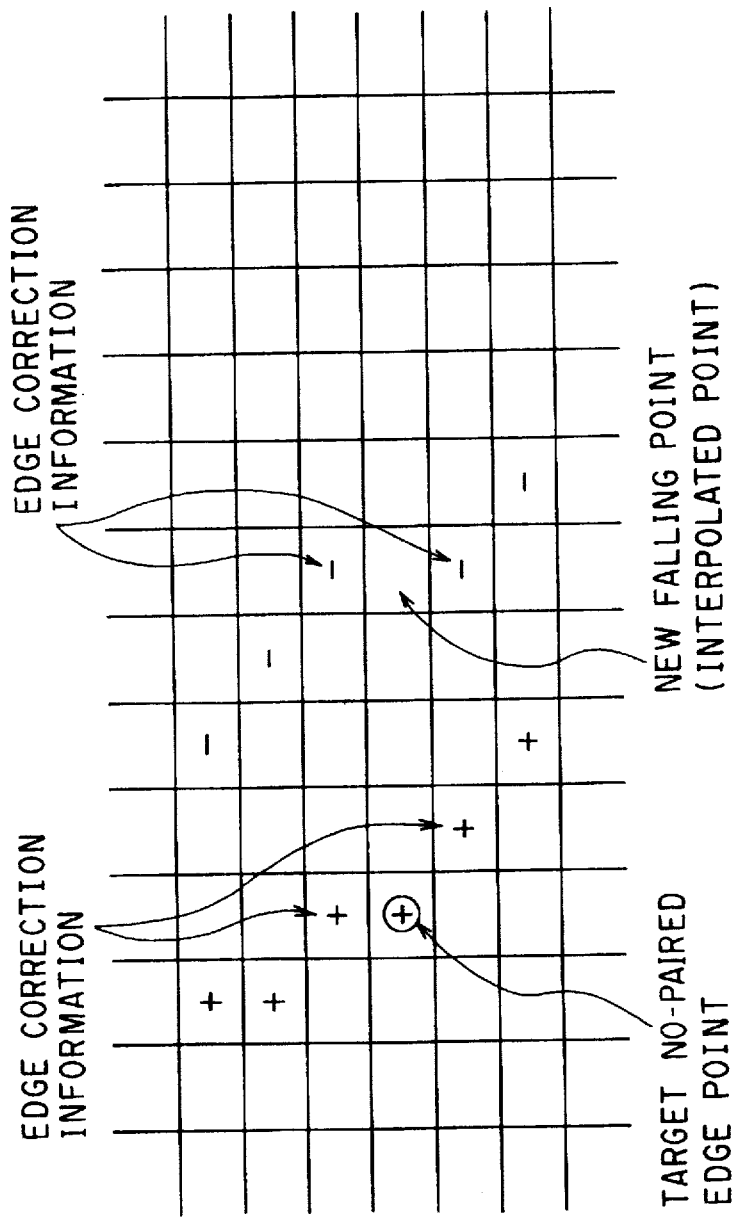
FIG. 41 is a conceptual diagram to help explain a primary interpolation process using adjacent edge pair information in a differential edge correcting process.

FIG. 41 is a conceptual diagram which helps explain a primary interpolation process using adjacent edge peak information in a differential edge correcting process.

If neither the condition at step S58 nor the condition at S59 is fulfilled, the process of "correction 2 using multi-valued density information" at step S61 explained below will be carried out.

Like the above-described "correction 1 using multi-valued density information", "correction 2 using multi-valued density information" searches for a point whose density is lower than the target no-paired edge point density. If the target point is rising, such a point must be in the range from the right side of the target point to another rising point. If the target point is falling, such a point must be in the range from the left side to another falling point. If there is a point meeting this condition, the point is determined to be a new edge point to be paired with the target no-paired edge point. If there is no point meeting the condition, the target no-paired edge point disappears.

Such a process is repeated. When no-paired edge points have run out in the target line, the processes at step S54 and later will be performed on the target line. Because the primary interpolation using vicinity edge information cannot be carried out on the first and the last line, only a correction using multi-valued density information is made.

The above explanation has covered edge correction only in the X direction. The same holds true for edge correction in the Y direction.

As explained above, according to the third to ninth embodiments, as compared with the first and second embodiments case where only the features of the edge are captured from a conventional binary image and supplied as a recognition input, the accuracy of feature extraction is improved because binary images and the amount of features corresponding to the binary image are used. Therefore, the effect of positional deviation is small, and character recognition capability can be improved over a wide range of image density (PCS). Furthermore, because the binary image, edge image, or a composite image of the two, obtained from the multi-valued image can be used to sense character areas, the accuracy of sensing and segmenting characters can be improved and the recognition rate can be raised. Because a mask smaller than 2×2 mask is used in direction component sensing, details in the direction components are less likely to be lost, contributing to improvements in the recognition rate.

While in the above embodiments, the present invention has been applied to the character recognition system in a postal-matter addressee reading apparatus. The invention is not limited to this and may be applied to a character recognition system which optically reads the characters on other types of forms and labels.

As described above in detail, according to the present invention, it is possible to provide a character recognition apparatus which enables not only improvements in the character recognition capability over a wide range of image density, but also improvements in the character recognition rate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A character recognition apparatus comprising:

means for converting image information including characters to be recognized into multi-valued image information according to image density;

first formation means for forming multi-valued differentiation information by differentiating the multi-valued image information in an X-direction and a Y-direction;

second formation means for forming multi-valued edge information pertaining to the X-direction and the Y-direction based upon the multi-valued differentiation information, said second formation means including:
means for detecting whether the multi-valued differentiation information has a "+" peak or a "−" peak;

third formation means for forming direction component information on a pixel by detecting a presence or an absence of edges extending in the X-direction and the Y-direction based upon the multi-valued edge information;

fourth formation means for dividing a character region into a plurality of narrow regions and forming directional feature vectors each representing a number of direction components present in one narrow region of the plurality of narrow regions; and means for performing character recognition by detecting a similarity between the directional feature vectors and reference directional feature vectors stored beforehand.

2. A character recognition apparatus comprising:

means for converting image information including characters to be recognized into multi-valued image information according to image density;

first formation means for forming multi-valued differentiation information by differentiating the multi-valued image information in an X-direction and a Y-direction;

second formation means for forming multi-valued edge information pertaining to the X-direction and the Y-direction based upon the multi-valued differentiation information;

third formation means for forming direction component information on a pixel by detecting a presence or an absence of edges extending in the X-direction and the Y-direction based upon the multi-valued edge information, said third formation means including:
means for determining a direction code by checking whether the multi-valued differentiation information includes a "+" or a "−" peak, and
means for converting the direction code into said direction component information;

fourth formation means for dividing a character region into a plurality of narrow regions and forming directional feature vectors each representing a number of direction components present in one narrow region of the plurality of narrow regions; and means for performing character recognition by detecting a similarity between the directional feature vectors and reference directional feature vectors stored beforehand.

3. A character recognition apparatus comprising:

means for converting image information including characters to be recognized into multi-valued image information according to image density;

first formation means for forming multi-valued differentiation information by differentiating the multi-valued image information in an X-direction and a Y-direction;

second formation means for forming multi-valued edge information pertaining to the X-direction and the Y-direction based upon the multi-valued differentiation information, said second formation means including:
means for detecting an isolated edge by checking the multi-valued edge information and for adding a probable edge which forms a pair with reference to the isolated edge;

third formation means for forming direction component information on a pixel by detecting a presence or an absence of edges extending in the X-direction and the Y-direction based upon the multi-valued edge information;

fourth formation means for dividing a character region into a plurality of narrow regions and forming directional feature vectors each representing a number of direction components present in one narrow region of the plurality of narrow regions; and means for performing character recognition by detecting a similarity between the directional feature vectors and reference directional feature vectors stored beforehand.

* * * * *